United States Patent [19]

Kobayashi et al.

[11] Patent Number: 5,120,929
[45] Date of Patent: Jun. 9, 1992

[54] DC RESISTANCE WELDING APPARATUS

[75] Inventors: Nobuo Kobayashi; Fumitomo Takano; Makoto Suzuki; Hitoshi Saito; Hidenori Koga, all of Sayama, Japan

[73] Assignee: Honda Giken Kogyo Kabushiki Kaisha, Tokyo, Japan

[21] Appl. No.: 437,369

[22] Filed: Nov. 16, 1989

[30] Foreign Application Priority Data

Nov. 17, 1988 [JP] Japan .................. 63-290949
Apr. 4, 1989 [JP] Japan ..................... 1-85210
Sep. 20, 1989 [JP] Japan .................... 1-244501

[51] Int. Cl.⁵ ............................................. B23K 11/24
[52] U.S. Cl. ..................................................... 219/110
[58] Field of Search ............ 219/108, 110, 116, 130.1, 219/130.32

[56] References Cited

U.S. PATENT DOCUMENTS

| | | | |
|---|---|---|---|
| 3,571,552 | 3/1971 | Opal | 219/108 |
| 3,840,720 | 10/1974 | Wolf | 219/116 |
| 4,503,316 | 3/1985 | Murase et al. | 219/130.32 |
| 4,564,742 | 1/1986 | Karlsson | 219/130.1 |
| 4,910,375 | 3/1990 | Izume | 219/110 |

FOREIGN PATENT DOCUMENTS

| | | |
|---|---|---|
| 0064570 | 11/1982 | European Pat. Off. . |
| 0072683 | 2/1983 | European Pat. Off. . |
| 0111474 | 6/1984 | European Pat. Off. . |
| 0146513 | 6/1985 | European Pat. Off. . |
| 1079000 | 8/1967 | United Kingdom . |
| 2046537 | 11/1980 | United Kingdom . |
| 1597870 | 9/1981 | United Kingdom . |

Primary Examiner—Clifford C. Shaw

[57] ABSTRACT

A DC resistance welding apparatus includes a pair of welding electrodes for sandwiching workpieces to be welded therebetween and a circuit connected to the welding electrodes for supplying a welding current to said welding electrodes. The circuit comprises includes a plurality of parallel-connected rectifying circuits each comprising having a welding transformer and rectifying circuit. The circuit allows a large welding current to be supplied to workpieces, and makes the DC resistance welding apparatus small in size and light in weight.

8 Claims, 20 Drawing Sheets

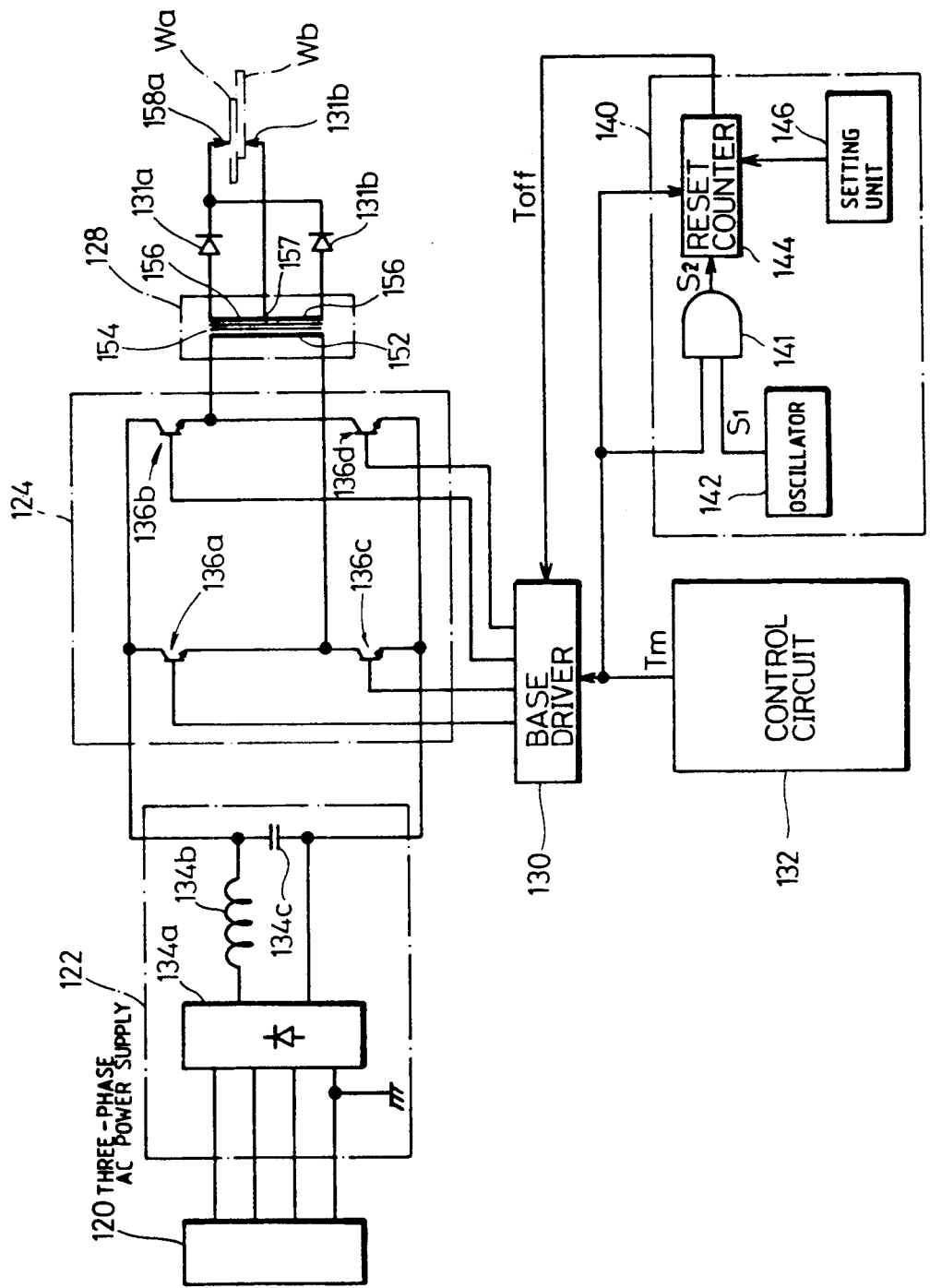

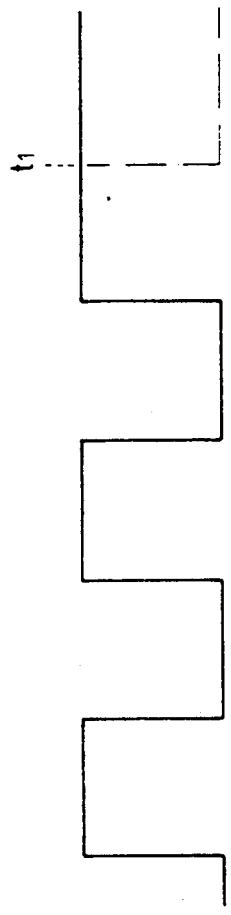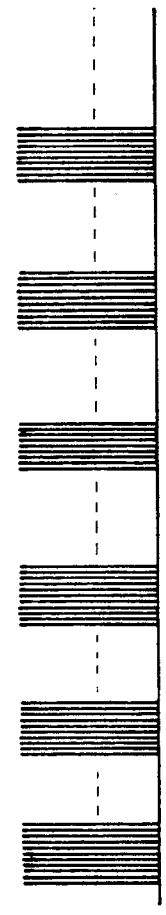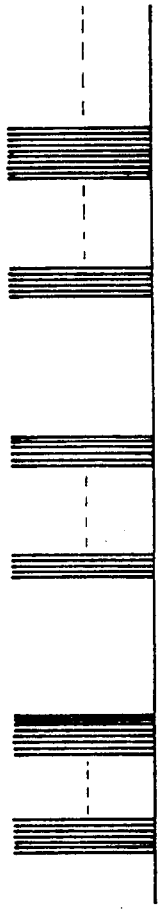
FIG.9(a) Tm
FIG.9(b) S₁
FIG.9(c) S₂
FIG.9(d) Toff a, e, i: OUTPUT CURRENTS FROM A POWER SUPPLY
b, f, j: OUTPUT CURRENTS FROM B POWER SUPPLY
c, g, k: OUTPUT CURRENTS FROM C POWER SUPPLY
d, h, l: OUTPUT CURRENTS FROM D POWER SUPPLY

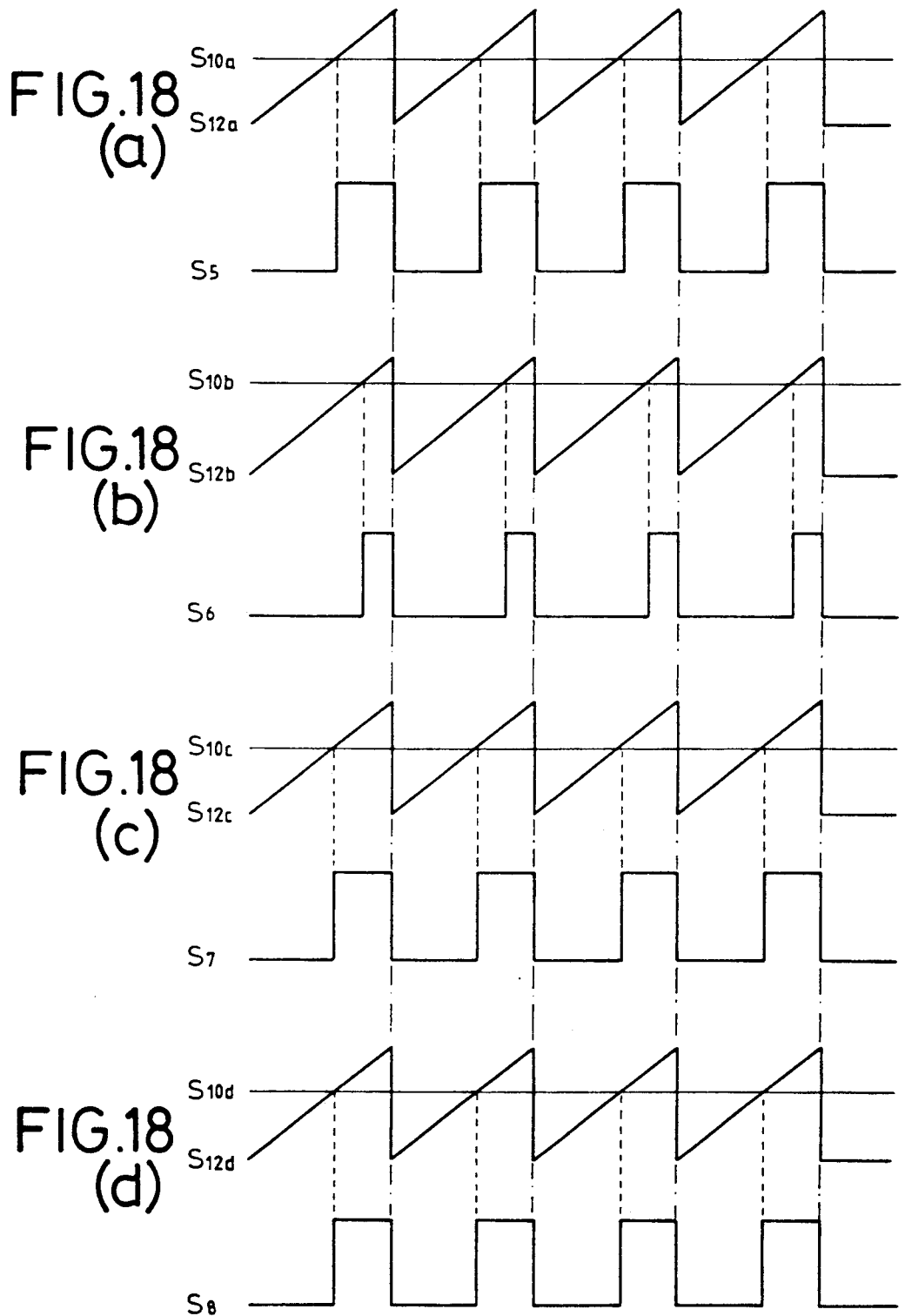

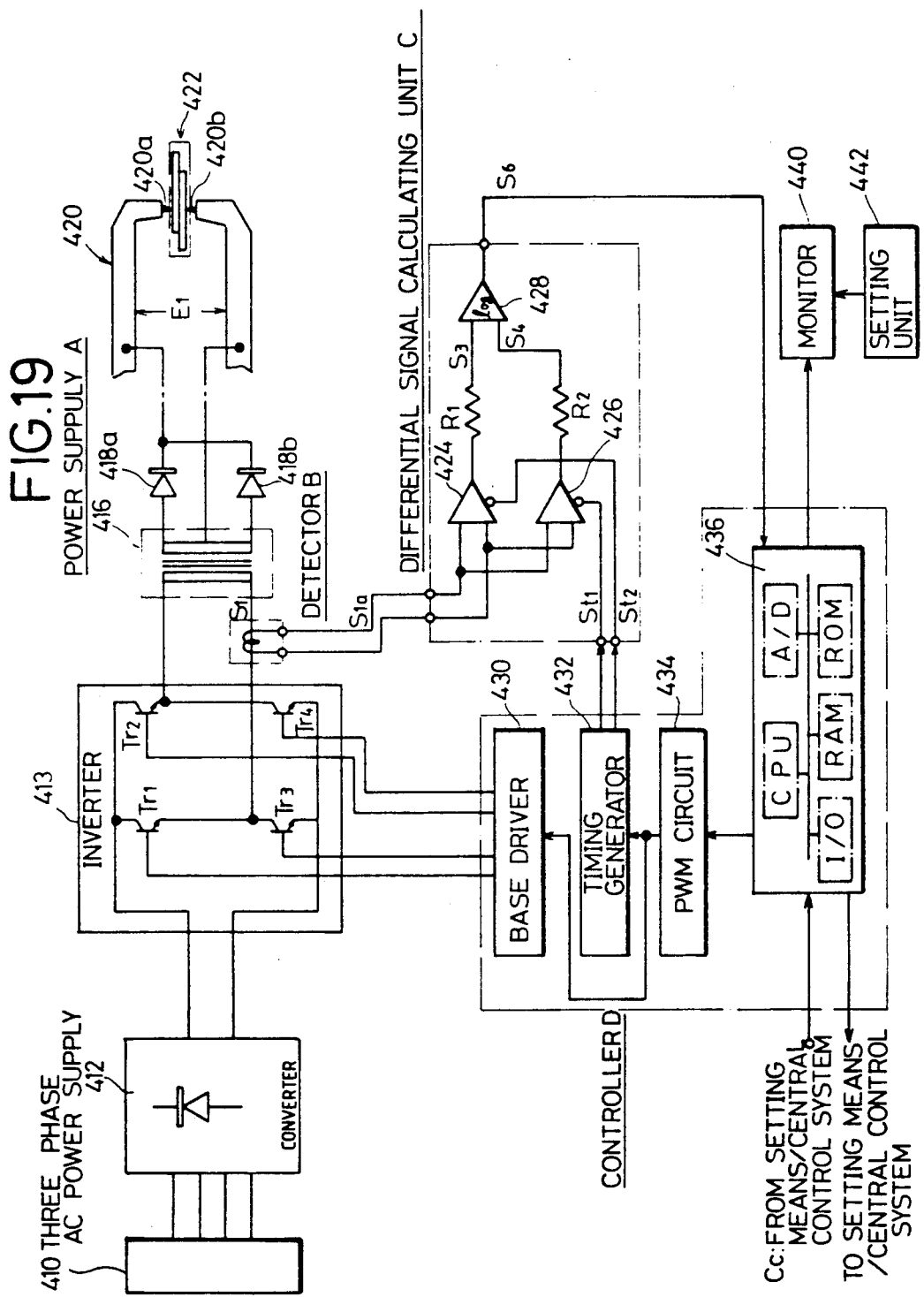

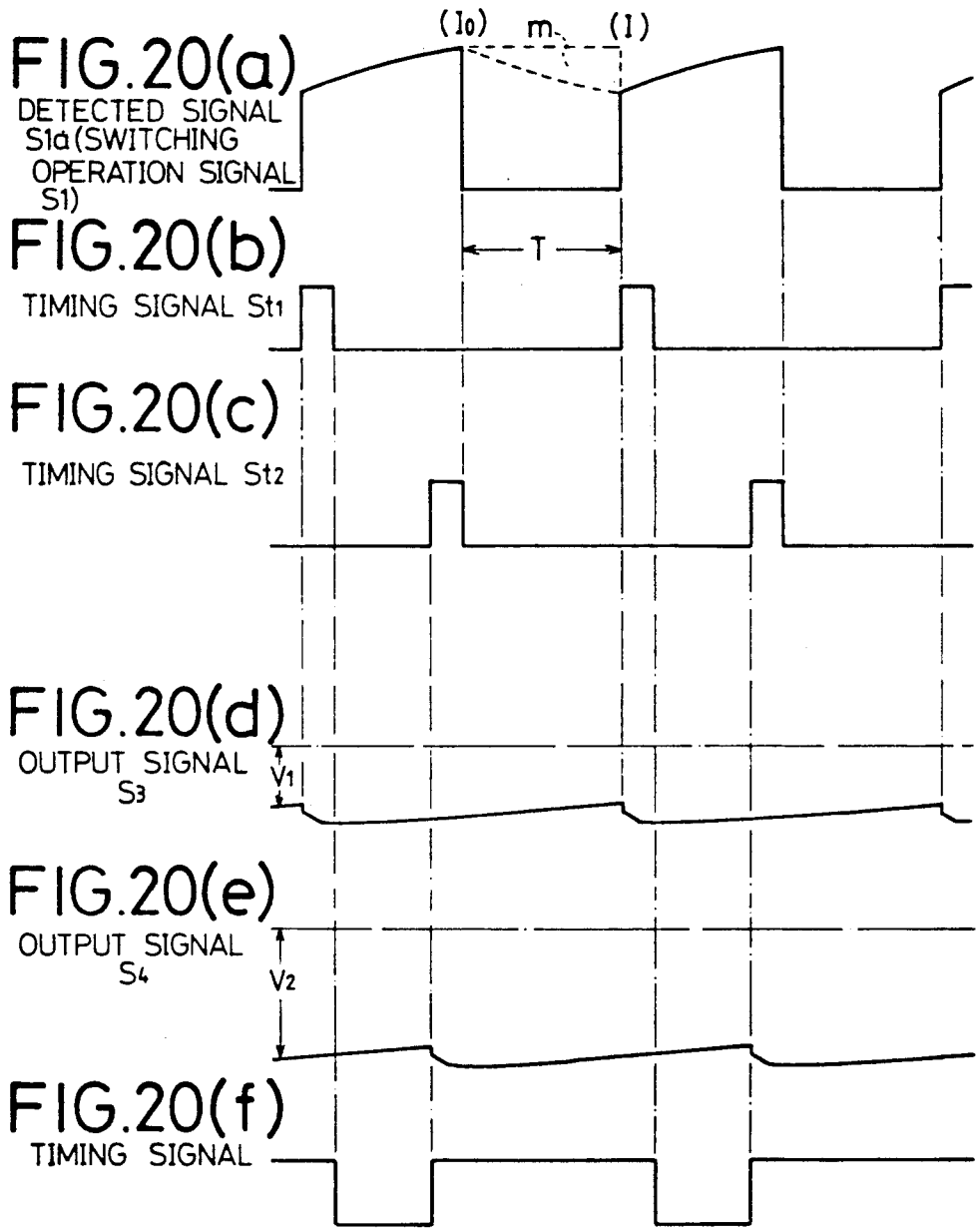

DC RESISTANCE WELDING APPARATUS

BACKGROUND OF THE INVENTION

The present invention relates to a DC resistance welding apparatus for resistance-welding workpieces with a direct current, and more particularly to an inverter-type DC resistance welding apparatus for rectifying three-phase AC electric energy into DC electric energy, converting the DC electric energy to high-frequency AC electric energy, then converting the high-frequency AC electric energy again into DC electric energy with an welding transformer and rectifiers, and then supplying the DC electric energy to welding electrodes to weld workpieces.

Resistance welding apparatus include a pair of electrodes for gripping a set of workpiece therebetween. While a welding current is being supplied between the electrodes to generate Joule heat, the electrodes are pressed against the workpieces to weld the workpieces to each other. The resistance welding is highly efficient as it requires no welding rods.

The resistance welding process requires an electric current much greater than other welding processes such as the arc welding process. Therefore, the welding transformer used by the resistance welding process is large and heavy. The large and heavy welding transformer is one of the drawbacks which make it difficult to install the resistance welding apparatus on the arm of a welding robot or the like.

To make the welding transformer smaller in size, there has recently been employed an inverter-type DC resistance welding apparatus which converts DC electric energy to high-frequency AC electric energy, supplies the high-frequency AC electric energy to a welding transformer to lower the voltage thereof, then converts the high-frequency AC electric energy to DC electric energy, and supplies the DC electric energy to welding gun arms. The DC electric energy is first converted to the high-frequency AC electric energy because the high-frequency AC electric energy allows the welding transformer to be relatively small and light-weight since the cross-sectional area of the core of the welding transformer is inversely proportional to the frequency of the high-frequency AC electric energy. The reason for converting the high-frequency AC electric energy back to the DC electric energy for application to the welding gun arms is that the DC electric energy supplied to the welding gun arms avoids a voltage drop which would otherwise be caused by an increased high-frequency impedance due to the stray inductance resulting from the length and shape of the welding gun arms, and also avoids a voltage drop which would otherwise be developed by the skin effect of the welding gun arms, so that the welding apparatus is highly efficient in operation.

One inverter-type DC resistance welding apparatus is shown in FIG. 1 of the accompanying drawings. The DC resistance welding apparatus comprises a converter unit 2, an inverter unit 4, and a welding transformer assembly 6 including a welding transformer 14. Three-phase AC electric energy from a commercial three-phase AC power supply 7 is converted to DC electric energy by a rectifier 8 and a capacitor 10 of the converter unit 2, and the DC electric energy is then converted to AC electric energy having a frequency higher than that of the three-phase AC electric energy by the inverter unit 4 which comprises a bridge of transistors 12a through 12d. The high-frequency AC electric energy is then converted to DC electric energy again by the welding transformer 14 with a central tap 19 on its secondary winding and rectifiers 16a, 16b. The DC electric energy is then supplied between welding electrodes 18a, 18b.

The welding electrode 18a is connected to the common joint between the rectifiers 16a, 16b, and the welding electrode 18b is connected to the central tap 19. A pair of workpieces Wa, Wb to be welded together is placed between the welding electrodes 18a, 18b. When a welding current is passed between the welding electrodes 18a, 18b through the workpieces Wa, Wb, the contacting surfaces of the workpieces Wa, Wb are melted and welded to each other.

DC resistance welding apparatus are always required to supply a large welding current and to be small in size. A large welding current is preferable when welding steel sheets such as plated steel sheets containing materials of different melting points or welding aluminum sheets or the like having a large thermal conductivity.

If the current capacity of the conventional DC resistance welding apparatus is to be increased and the DC resistance welding apparatus is to be installed on the arm of a welding robot, then the welding transformer 14 will be increased in weight, requiring the robot to be large in size, and it is required to connect the transistors 12a through 12d of the inverter unit 4 or the rectifiers 16a, 16b parallel to each other. As a result, the DC resistance welding apparatus may have stability and reliability problems.

Heretofore, the transistors of the inverter are operated within a continuous DC rating range. The inverter is designed such that even if driver circuits connected to the bases of the transistors malfunction and the transistors remain conductive, the inverter will not be broken insofar as it is within its thermal limits. The actual operating range of the inverter is therefore required to be smaller than the continuous DC rating range. As a consequence, the conventional DC resistance welding apparatus is not suitable for use in applications in which a large welding current is to be supplied to the welding electrodes.

SUMMARY OF THE INVENTION

It is a general object of the present invention to provide a DC resistance welding apparatus which has a plurality of parallel-connected rectifying circuits each comprising a welding transformer and rectifiers, so that a large welding current can be supplied to workpieces, and which is small in size and light in weight.

Another object of the present invention is to provide a DC resistance welding apparatus having a means for monitoring the time in which semiconductor devices such as transistors of an inverter unit are conducted, to allow the semiconductor devices to be operated with a current larger than a continuous rating range, so that a large welding current can be supplied to workpieces.

Still another object of the present invention is to provide a DC resistance welding apparatus having means for individually detecting failures of parallel inverters, such as output reductions or overcurrents thereof, so that all the inverters can quickly be inactivated in response to detection of such a failure.

Yet another object of the present invention is to provide a DC resistance welding apparatus in which the trailing edges of switching signals are equalized in timing depending on the distorting action of welding transformers connected to parallel inverters, thereby preventing overcurrents from being generated at the trailing edges of inverter outputs for increased efficiency.

Yet still another object of the present invention is to provide a DC resistance welding apparatus in which a signal corresponding to an energized condition of workpieces to be welded can indirectly and accurately be produced from a change in a current upon switching operation of inverters, and the application of electric energy to the workpieces is stopped based on the signal thus produced, so that the workpieces can appropriately be welded.

A further object of the present invention is to provide a DC resistance welding apparatus comprising a pair of welding electrodes for sandwiching workpieces to be welded therebetween, and a circuit connected to the welding electrodes for supplying a welding current to the welding electrodes, the circuit comprising a plurality of parallel-connected rectifying circuits each comprising a welding transformer and rectifying means.

A still further object of the present invention is to provide the DC resistance welding apparatus wherein the welding transformer includes a secondary winding having a central tap, and the rectifying means comprises a pair of rectifiers, the central tap serving as one output terminal of each of the rectifying circuits, the secondary winding having one end connected to one terminal of one of the rectifiers, and the other end connected to one terminal of the other of the rectifiers, the other terminals of the rectifiers being connected to each other as another output terminal of each of the rectifying circuits, the one output terminals of the rectifying circuits being connected together to one of the welding electrodes, and the other output terminals of the rectifying circuits being connected together to the other of the welding electrodes.

A yet further object of the present invention is to provide the resistance welding apparatus further including an inverter unit comprising a plurality of inverters connected respectively to the rectifying circuits for driving the rectifying circuits.

A yet still further object of the present invention is to provide the DC resistance welding apparatus further including main control means connected to the inverters, and current detecting means for generating a signal proportional to the welding current supplied from the circuit to the welding electrodes and feeding the signal back to the main control means, the main control means having feedback control means for keeping the welding current constant based on the signal fed from the current detecting means to the main control means.

Another object of the present invention is to provide the resistance welding apparatus further including auxiliary control means connected respectively to the inverters, and current detecting means for generating signals proportional to branch welding currents supplied respectively from the rectifying circuits and feeding the signals back to the auxiliary control means, the auxiliary control means having feedback control means for keeping the branch welding currents constant based on the signals fed from the current detecting means to the auxiliary control means.

Still another object of the present invention is to provide the DC resistance welding apparatus further including auxiliary control means connected respectively to the inverters, first current detecting means for generating signals proportional to branch welding currents supplied respectively from the rectifying circuits and feeding the signals back to the auxiliary control means, the auxiliary control means having feedback control means for keeping the branch welding currents constant based on the signals fed from the first current detecting means to the auxiliary control means, main control means connected to the inverters, and second current detecting means for generating a signal proportional to the welding current supplied from the circuit to the welding electrodes and feeding the signal back to the main control means, the main control means having feedback control means for keeping the welding current constant based on the signal fed from the second current detecting means to the main control means.

Yet another object of the present invention is to provide the DC resistance welding apparatus further including auxiliary control means connected respectively to the inverters, current detecting means for generating signals proportional to branch welding currents supplied respectively from the rectifying circuit and feeding the signals back to the auxiliary control means, and main control means connected to the auxiliary control means for calculating command values indicative of branch welding currents to be produced by the respective inverters based on a command value for the welding current, and for supplying the calculated command values to the auxiliary control means, the auxiliary control means having feedback control means for keeping the branch welding currents constant based on the calculated command values, the main control means having timer means for synchronizing the branch welding currents in timing.

It is also an object of the present invention to provide a DC resistance welding apparatus a pair of welding electrodes for sandwiching workpieces to be welded therebetween, an inverter unit having semiconductors switchable into and out of operation for converting DC electric energy to AC electric energy, means for converting the AC electric energy to DC electric energy and applying the DC electric energy to the welding electrodes, a base driver for operating the semiconductors with switching currents higher than a continuous rating range, and a timer circuit for measuring a conduction time of the semiconductors and cutting off the switching currents when the measured conduction time exceeds a predetermined time.

Another object of the present invention is to provide the DC resistance welding apparatus wherein the time circuit comprises an oscillator for generating a pulsed signal having a frequency higher than the frequency of the AC electric energy, an AND gate having an input terminal supplied with the pulsed signal and an input terminal supplied with a signal corresponding to the AC electric energy, a presettable counter for counting a pulsed signal from the AND gate and supplying a count signal to the base driver, and a setting unit for setting the presettable counter to a preset value corresponding to the predetermined time.

Still another object of the present invention is to provide a DC resistance welding apparatus comprising a pair of welding electrodes for sandwiching workpieces to be welded therebetween, a plurality of power supplies each comprising a converter, an inverter, a welding transformer, and a rectifier, for supplying a welding current produced from the rectifiers to the welding electrodes, detecting means for detecting currents flowing either between the converters and the inverters or from the inverters of the power supplies, and for producing signals indicating the detected currents, comparing means for comparing the signals from the detecting means with predetermined levels and for producing decision signals, and control means responsive to the decision signals for applying drive signals to the inverters to inactivate the inverters.

Yet another object of the present invention is to provide the DC resistance welding apparatus wherein the detecting means include isolator means for removing noise from the signals produced by the detecting means.

Yet still another object of the present invention is to provide a DC resistance welding apparatus comprising a pair of welding electrodes for sandwiching workpieces to be welded therebetween, a plurality of power supplies each comprising a converter, an inverter, a welding transformer, and a rectifier, for supplying a welding current produced from the rectifiers to the welding electrodes, detecting means for producing detected signals indicative of operation of the inverters supplied with switching drive signals, means for comparing the detected signals and the switching drive signals and for producing distorting action signals representing distorting actions of the welding transformers, and control means responsive to the distorting action signals for controlling leading edges of the respective switching drive signals to equalize trailing edges thereof in timing.

A further object of the present invention is to provide the DC resistance welding apparatus wherein the control means comprises a clock signal generator for generating a clock signal, a sawtooth generator for generating a sawtooth signal from the clock signal, and a comparator for comparing the distorting action signals with the sawtooth signal to produce switching drive signals having pulse durations determined by the distorting action signals as a threshold level and trailing pulse edges equalized in timing.

A still further object of the present invention is to provide a DC resistance welding apparatus comprising a welding gun for sandwiching workpieces to be welded therebetween, a power supply unit comprising a converter, an inverter, a welding transformer, and a rectifier, for supplying a welding current produced from the rectifier to the welding gun, detecting means for producing a detected signal corresponding to an output waveform from the inverter, leading/trailing edge current detecting means for producing current signals at leading and trailing edges of the detected signal, control means for applying a control signal to the leading/trailing edge current detecting means, and calculating means for producing a differential current signal indicative of a change in the resistance of the workpieces when the welding current flows therethrough, from the current signals at leading and trailing edges of the detected signal, and applying the differential current signal to the control means.

A yet further object of the present invention is to provide the DC resistance welding apparatus further including de-energizing means for cutting off the welding current supplied to the welding gu when the differential current signal applied from the calculating means to the control means is of a predetermined value.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a circuit diagram, partly in block form, of an electric circuit of a DC resistance welding apparatus according to still another embodiment of the present invention;

FIGS. 9(a)-9(d) are diagrams illustrating operation of the DC resistance welding apparatus shown in FIG. 8;

FIGS. 18(a)-18(d) are diagrams showing signal waveforms and timing, illustrative of operation of the DC resistance welding apparatus shown in FIGS. 16 and 17;

FIG. 19 is a block diagram of a DC resistance welding apparatus according to a still further embodiment of the present invention; and FIGS. 20(a)-20(f) are diagrams showing signal waveforms and timing, illustrative of operation of the DC resistance welding apparatus shown in FIG. 19.

DETAILED DESCRIPTION OF THE PREFERRED EMBODIMENTS

Figure 1:
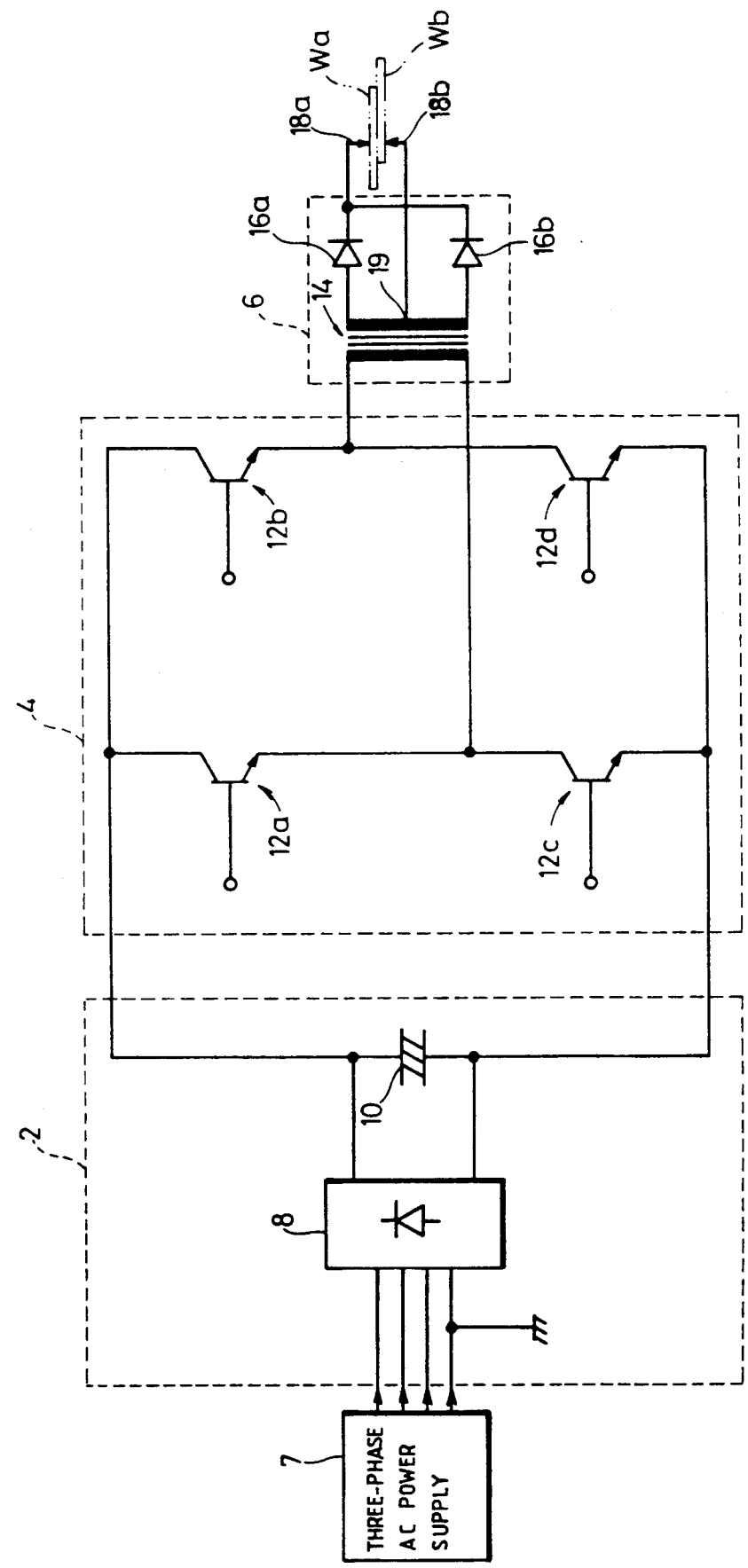
FIG. 1 is a circuit diagram, partly in block form, of an electric circuit of a conventional DC resistance welding apparatus.

Like or corresponding parts are denoted by like or corresponding reference characters throughout the figures.

Figure 2:
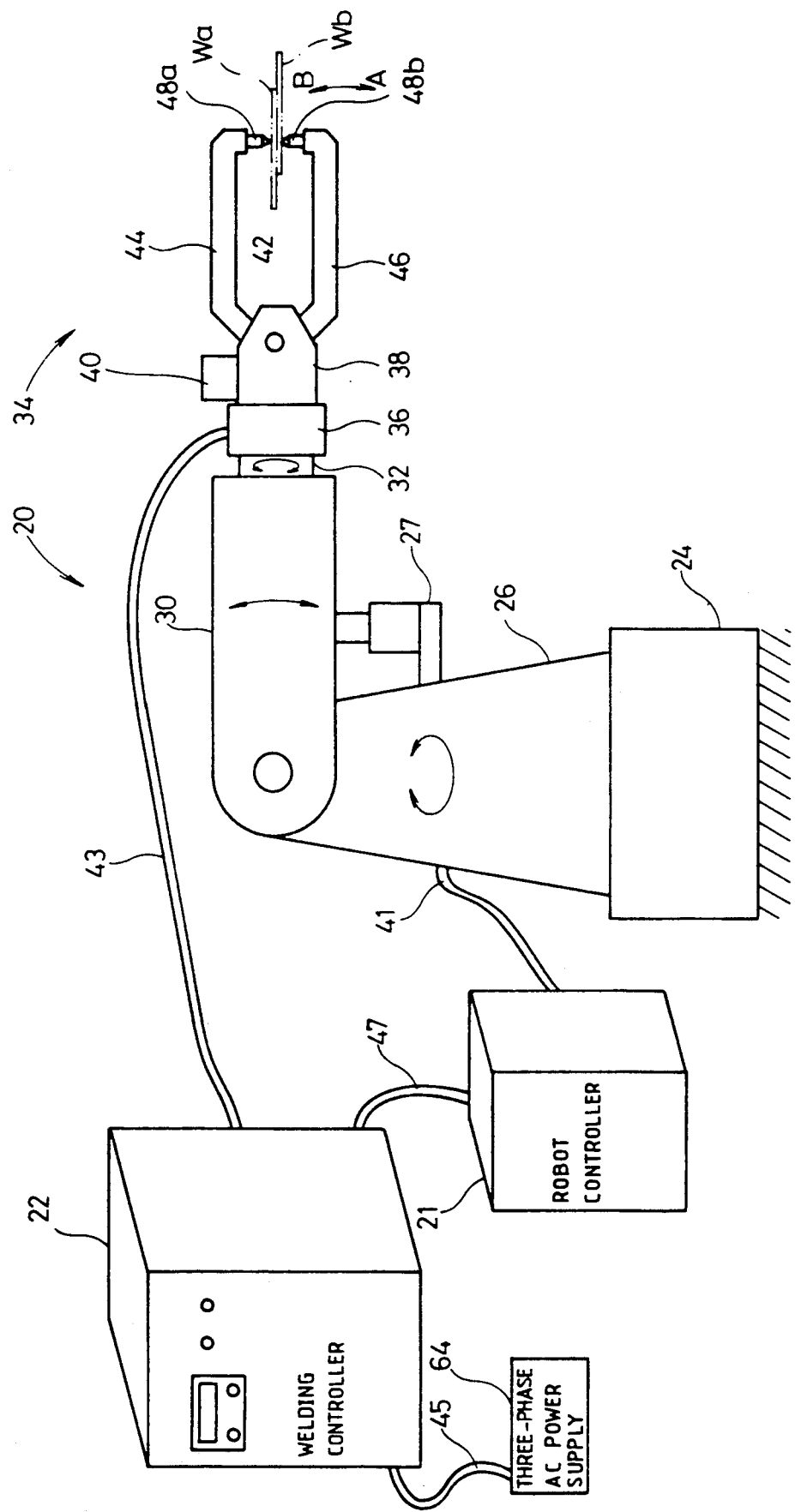
FIG. 2 is a schematic view of a welding robot system incorporating a DC resistance welding apparatus according to an embodiment of the present invention.

FIG. 2 schematically shows a welding robot system incorporating a DC resistance welding apparatus according to the present invention. The welding robot system basically comprises a welding robot 20, a robot controller 21, and a welding controller 22. The welding robot 20 includes a first arm 26 mounted on a base 24 for rotation in the directions indicated by the arrow, and a second arm 30 having one end pivotally coupled to the upper end of the first arm 26, the second arm 30 being vertically movable in the directions indicated by the arrow by a cylinder 27 supported on the first arm 26. The cylinder 27 may comprise a hydraulic cylinder or the like.

A gun assembly 34 is mounted on the other end of the second arm 30 by a rotatable shaft 32. The gun assembly 34 comprises a welding transformer unit 36, a bracket 38 attached to the welding transformer unit 36, a cylinder 40 fixed to the upper surface of the bracket 38, and a fixed gun arm 44 and a movable gun arm 46 which are supported on the bracket 38 by a pivot shaft 42 mounted substantially centrally on the bracket 38. Electrodes 48a, 48b are mounted on distal ends of the fixed and movable gun arms 44, 46, respectively. The gun assembly 34 is angularly movable by the rotatable shaft 32 in the directions indicated by the arrow. The movable gun arm 46 is movable toward and away from the fixed gun arm 44 in the directions indicated by the arrowheads A, B by a cylinder 40 which is actuatable under a pneumatic pressure or the like. The first arm 26, the cylinder 27, the second arm 30, and the rotatable shaft 32 are electrically connected to the robot controller 21 by a cable 41. The cylinder 40 and the welding transformer unit 36 are connected to the welding controller 22 by a cable 43. The welding controller 22 is electrically connected to a three-phase AC power supply 64 by a cable 45 and also to the robot controller 21 by a cable 47. The robot controller 21 controls the attitude of the welding robot 20 based on teaching data, and gives a welding start command to the welding controller 22. The welding controller 22 controls various welding conditions such as the level and energization time of a welding current which is supplied from the electrodes 48a, 48b to workpieces Wa, Wb.

Figure 3:
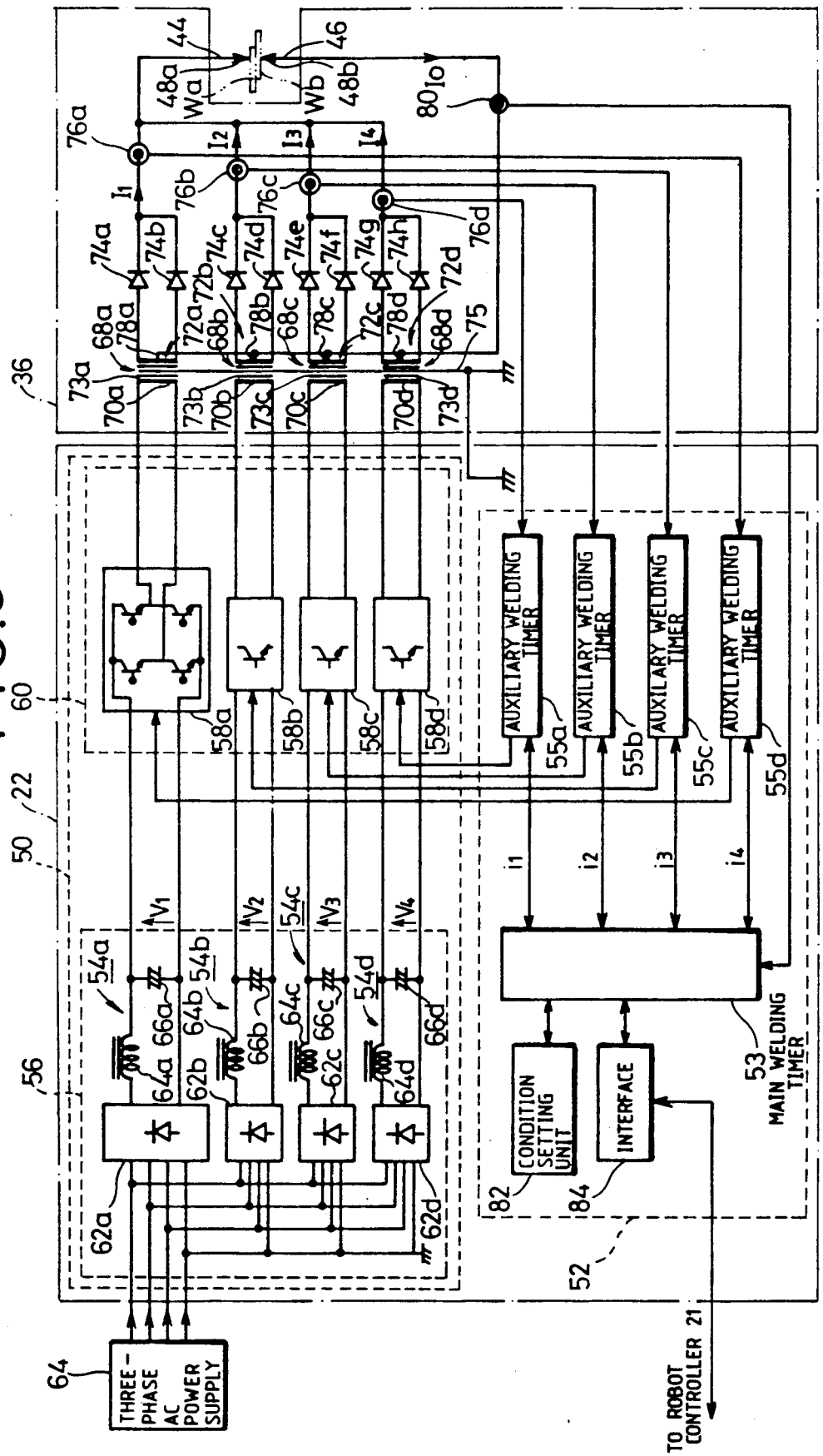
FIG. 3 is a circuit diagram, partly in block form, of an electric circuit of the DC resistance welding apparatus shown in FIG. 2.

FIG. 3 shows an electric circuit for controlling welding conditions of the DC resistance welding apparatus.

The electric circuit shown in FIG. 3 generally comprises the welding controller 22 and the welding transformer unit 36. The welding controller 22 includes a power converter assembly 50 and a control unit 52. The power converter assembly 50 comprises a converter unit 56 having four converters 54a through 54d for converting three-phase AC electric energy to DC electric energy, and an inverter unit 60 having four inverters 58a through 58d for converting the DC electric energy to a high-frequency AC pulse train. The control unit 52 is basically composed of a main welding timer 53 serving as a main control means and auxiliary welding timers 55a through 55d serving as auxiliary control means.

The converters 54a through 54d comprise rectifying diode stacks 62a through 62d with their input terminals supplied with commercial AC electric energy having a voltage of 400 V from the three-phase AC power supply 64. The commercial AC electric energy is rectified by the diode stacks 62a through 62d, and smoothed by DC reactors 64a through 64d and capacitors 66a through 66d of the converters 54a through 54d. DC voltages V1 through V4 rectified and smoothed by the converters 54a through 54d are then applied to the input terminals of the inverters 58a through 58d. Each of the inverters 58a through 58d comprises a full bridge of transistors.

The inverters 58a through 58d have respective output terminals connected to primary windings 70a through 70d of four welding transformers 68a through 68d of the welding transformer unit 36 which also have secondary windings 72a through 72d, respectively. Transformer cores 73a through 73d and an electrostatic shield electrode 75 are interposed between the primary windings 70a through 70d and the secondary windings 72a through 72d. The secondary windings 72a through 72d have output terminals connected to ends, such as anodes, for example, of pairs of rectifying diodes 74a through 74h whose other ends, i.e., cathodes, are connected to each other in the respective pairs associated with the respective welding transformers 68a through 68d. The junctions at which the cathodes of the pairs of the diodes 74a through 74h are connected are connected to current detectors 75a through 75d, respectively, such as current transformers or Hall-effect devices for monitoring branch currents I1 through I4. The current detectors 75a through 75d are then connected in common to the welding electrode 48a through the fixed gun arm 44.

The secondary windings 72a through 72d have respective central taps 78a through 78d which are connected in common to the other welding electrode 48b through a current detector 80 such as a current transformer or a Hall-effect device for monitoring a welding current I0 in the secondary windings and also through the movable gun arm 46. The workpieces Wa, Wb are positioned and held between the electrodes 48a, 48b. The welding current I0 is therefore supplied to the welding electrodes 48a, 48b from the circuit composed of parallel-connected single-phase rectifying circuits with central taps.

The welding transformer unit 36 is composed of the four welding transformers 68a through 68d in view of electric specifications such as current capacities of the rectifying diodes 74a through 74h which supply the welding current, electric specifications such as current capacities of the full-bridge-connected power transistors of the inverters 58a through 58d, and mechanical specifications such as weights of the gun assembly 34 supported by the second arm 30 of the welding robot 20. The separate welding transformers are more advantageous than a single welding transformer in that the semiconductors such as transistors and diodes are smaller in size, the magnetic paths extending between the primary and second windings across the transformer cores are shorter, and the transformers themselves are smaller and lighter as the transformer cores have increased heat-radiating surface areas.

An output signal from the current detector 80, i.e., a signal proportional to the welding current I0, is fed to the main welding timer (main control means) 53 which monitors the welding current I0 and feeds back the same for control. The main welding timer 53 comprises a one-chip microprocessor having a CPU, a ROM, a RAM, and an interface, and serves as a system controller for effecting sequence control on a welding process. To the main welding timer 53, there are connected a condition setting unit 82 which sets welding conditions such as a welding current, an energization time, etc., and also an interface 84 coupled to the robot controller 21. The main welding timer 53 and the robot controller 21 cooperate with each other in carrying out an interlock operation.

Output signals from the current detectors 76a through 76d are applied to the inverters 58a through 58d, respectively, through the auxiliary welding timers 55a through 55d which serve as auxiliary welding control means and have timer means and base drivers for energizing the bases of the full-bridge-connected transistors of the inverters 58a through 58d. The auxiliary welding timers 55a through 55d are connected to the main welding timer 53.

Each of the auxiliary welding timers 55a through 55d comprises a one-chip microprocessor having a CPU, a ROM, a RAM, and an interface, and have pulse-width-modulation (PWM) circuits with a fixed frequency. The auxiliary welding timers 55a through 55d controls the welding system under the control of the main welding timer 53.

Figure 4:
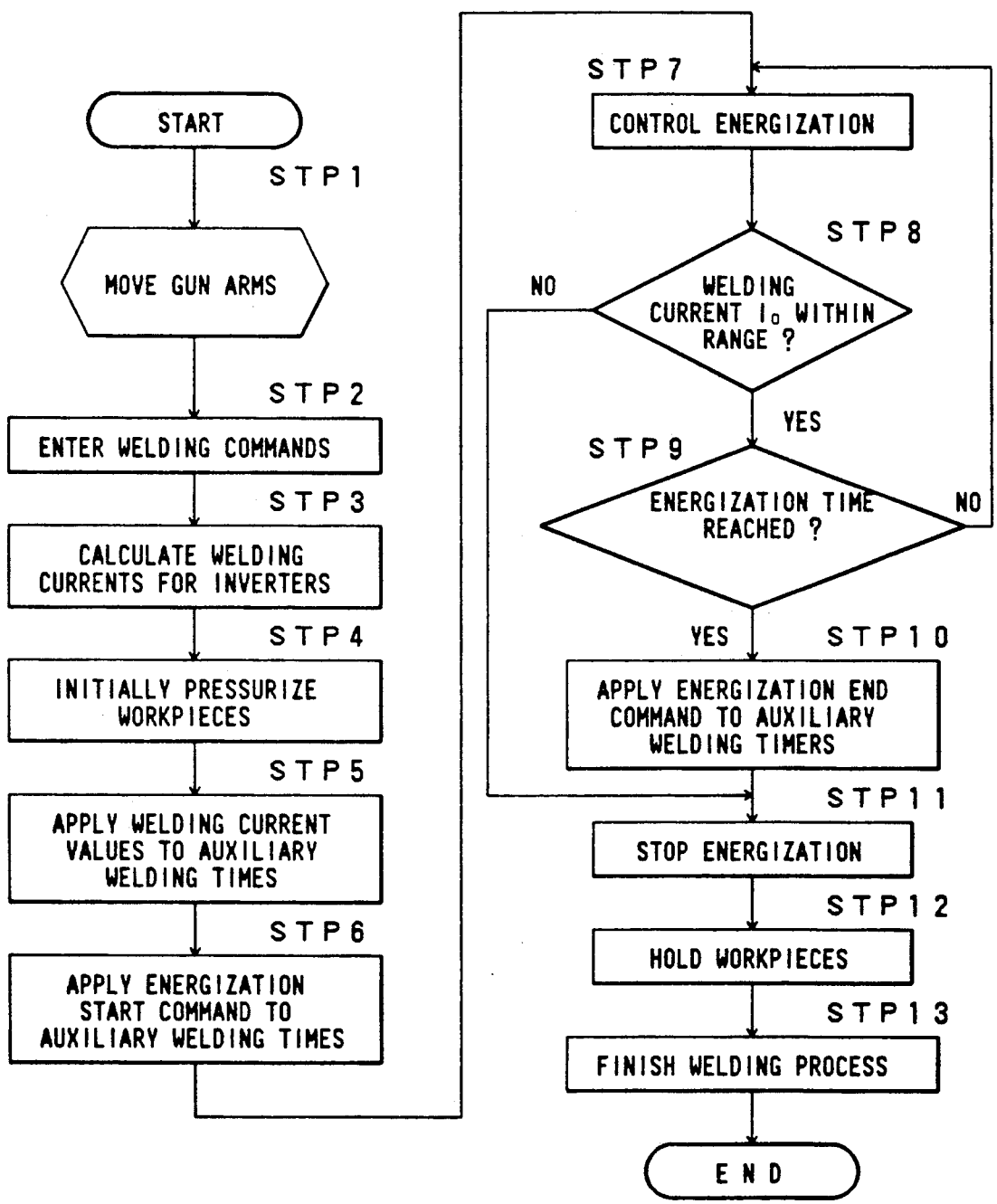
FIG. 4 is a flowchart of an operation sequence of the DC resistance welding apparatus.

The DC resistance welding apparatus of the present invention is basically constructed as described above. Operation and advantages of the DC resistance welding apparatus will now be described with reference to the flowchart of FIG. 4 which represents an algorithm of a program stored in the ROMs of the main welding timer 53 and the auxiliary welding timers 55a through 55d and also in a ROM of the robot controller 22.

The cylinder 40 (FIG. 2) is actuated by the welding controller 22 to move the movable gun arm 46 in the direction indicated by the arrow A, thereby holding the electrodes 48a, 48b apart from each other. Then, the first arm 26 and the cylinder 27 are operated to vertically move the second arm 30 and rotate the rotatable shaft 32 based on teaching data stored in the robot controller 21, until the fixed gun arm 44 and the movable gun arm 46 are moved to a position to grip the workpieces Wa, Wb, in a step STP1.

Then, a welding start command is applied from the robot controller 21 to the main welding timer 53 through the interface 84 of the welding controller 22. Prescribed welding commands which are representative of a welding current and an energization time depending on the thickness and material of the workpieces Wa, Wb are applied from the condition setting unit 82 to the main welding timer 5 in response to the welding start command in a step STP2.

Based on the applied welding commands, the main welding timer 53 reads data corresponding to the welding current I0 for the workpieces Wa, Wb from its own RAM, and calculates current settings i1 through i4 corresponding to branch welding currents I1 through I4 to be produced by the respective inverters 58a through 58d, each of the current settings i1 through i4 being ¼ of the welding current I0, in a step STP3.

Thereafter, the cylinder 40 is actuated to move the movable gun arm 46 in the direction indicated by the arrow B to bring the electrodes 48a, 48b into abutment against the workpieces Wa, Wb, respectively. The workpieces Wa, Wb start being initially pressurized under an initial pressure read from the memory, in a step STP4.

Then, the main welding timer 53 reads data corresponding to the energization time t0 from the RAM, and applies the welding current settings i1 through i4 and an energization start command to the auxiliary welding timers 55a through 55d in a step STP5.

The auxiliary welding timers 55a through 55d now controls energization of the welding transformer unit 36 in a step STP7. More specifically, the auxiliary welding timers 55a through 55d simultaneously energize the inverters 58a through 58d, respectively, based on the welding current settings i1 through i4. Stated otherwise, the inverters 58a through 58d start being energized synchronously by the respective auxiliary welding timers 55a through 55d.

High-frequency alternating currents having a frequency of 800 Hz, for example, from the inverters 58a through 58d are transferred from the primary windings 70a through 70d to the secondary windings 72a through 72d of the welding transformers 68a through 68d, and then rectified by the pairs of the diodes 74a through 74d connected to the output terminals of the secondary windings 72a through 72d. Then, the rectified currents are added together and supplied as the welding current I0 between the electrodes 48a, 48b. The auxiliary welding timers 55a through 55d, which have feedback control means such as comparator/amplifiers, compare signals corresponding to the branch currents I1 through I4 from the current detectors 76a through 76d with the welding current settings i1 through i4 from the main welding timer 53, and pulse-width-modulated currents to be applied to the bases of the transistors of the inverters 58a through 58d for feedback control of the branch currents I1 through I4. Therefore, the branch currents I1 through I4 are equalized to the respective welding current settings i1 through i4 and supplied as constant currents combined together to the workpieces Wa, Wb through the respective current detectors 76a through 76d.

The main welding timer 53 is supplied with a signal corresponding to the welding current I0 from the current detector 80 which monitors the welding current I0 passing between the workpieces Wa, Wb. If an abnormal current is detected by the current detector 80, the main welding timer 53 applies an energization end command to the auxiliary welding timers 55a through 55d, and also supplies a welding error signal as an interlock signal to the robot controller 21 through the interface 84. More specifically, if the welding current I0 falls within a predetermined range corresponding to a command value for the welding current I0 in a step STP8, then a step STP9 determines whether a predetermined energization time t0 has been reached or not. If the energization time t0 has been reached, then the main welding timer 53 applies an energization end command to the auxiliary welding timers 55a through 55d in a step STP10. Then, the auxiliary welding timers 55a through 55d simultaneously stop supplying the base currents to the transistors of the inverters 58a through 58d in a step STP11. Accordingly, the inverters 58a through 58d driven by the respective auxiliary welding timers 55a through 55d are de-energized synchronously by the main welding timer 53. The supply of the welding current I0 to the workpieces Wa, Wb is now cut off.

The workpieces Wa, Wb remain gripped and held between the fixed and movable gun arms 44, 46 for a certain period of time while the welding current I0 is being cut off in a step STP12. During this time, a nugget (not shown) formed between the workpieces Wa, Wb is substantially fully solidified, thus joining the workpieces Wa, Wb together. Subsequently, a welding process end signal is applied from the main welding timer 53 to the gun assembly 34, whereupon the movable gun arm 46 is moved in the direction indicated by the arrow A away from the fixed gun arm 44 by the cylinder 40. The workpieces Wa, Wb are retracted away from the gun arms 44, 46, thus finishing the welding process in a step STP13.

With the aforesaid embodiment (hereinafter also referred to as a first embodiment), since the inverters 58a through 58b are connected parallel to each other and the welding transformers 68a through 68d are also connected parallel to each other, the DC gun assembly 34 may be small in size and light in weight. Therefore, the welding robot 20 with the gun assembly 34 attached to the second arm 30 thereof will not be reduced in durability. The gun assembly 36 can move in an increased space range as the workpieces Wa, Wb and the gun assembly 36 of a reduced size are less liable to physically interfere with each other.

Inasmuch as the load on the second arm 30 is reduced, the arms 26, 30 of the welding robot 20 can move at an increased speed, and hence the time of each welding cycle is shortened. Since each of the transistors of the inverters 58a through 58d has a reduced current capacity, it is not necessary to connect these transistors parallel to each other. This is advantageous in that the transistors are not required to be sorted out for well-balanced current capacities which would otherwise be taken into consideration if they were to be connected parallel to each other. Accordingly, the inverter unit 60 is highly stable in operation. If any one of the inverters 58a through 58d fails, it can easily be replaced with a new one. Thus, the inverter unit 60 can quickly be recovered from a malfunction caused by a failure of any one of the inverters 58a through 58d.

Figure 5:
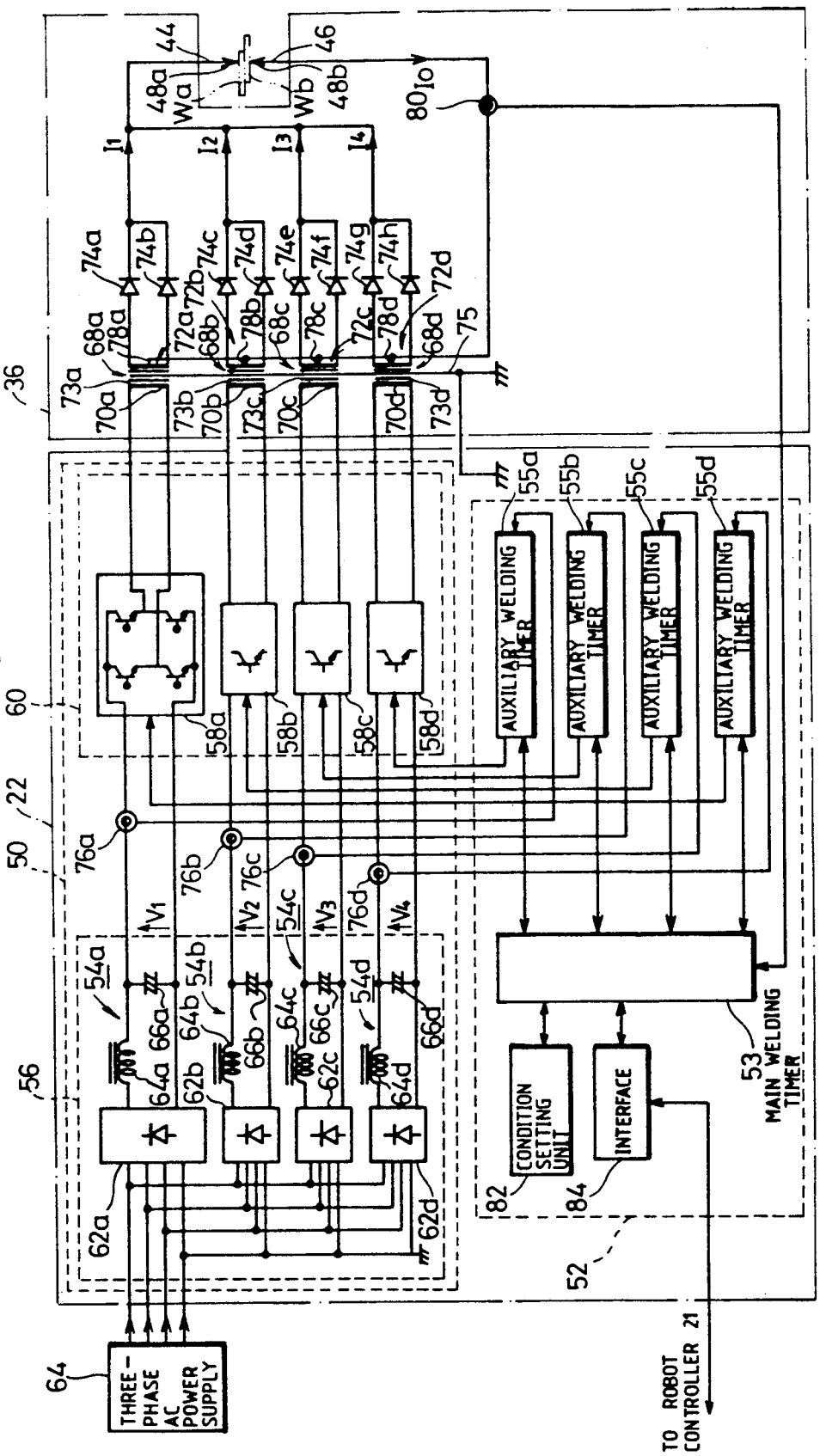
FIGS. 5 through 7 are circuit diagrams, partly in block form, of electric circuits of DC resistance welding apparatus according to other embodiments of the present invention.
Figure 6:
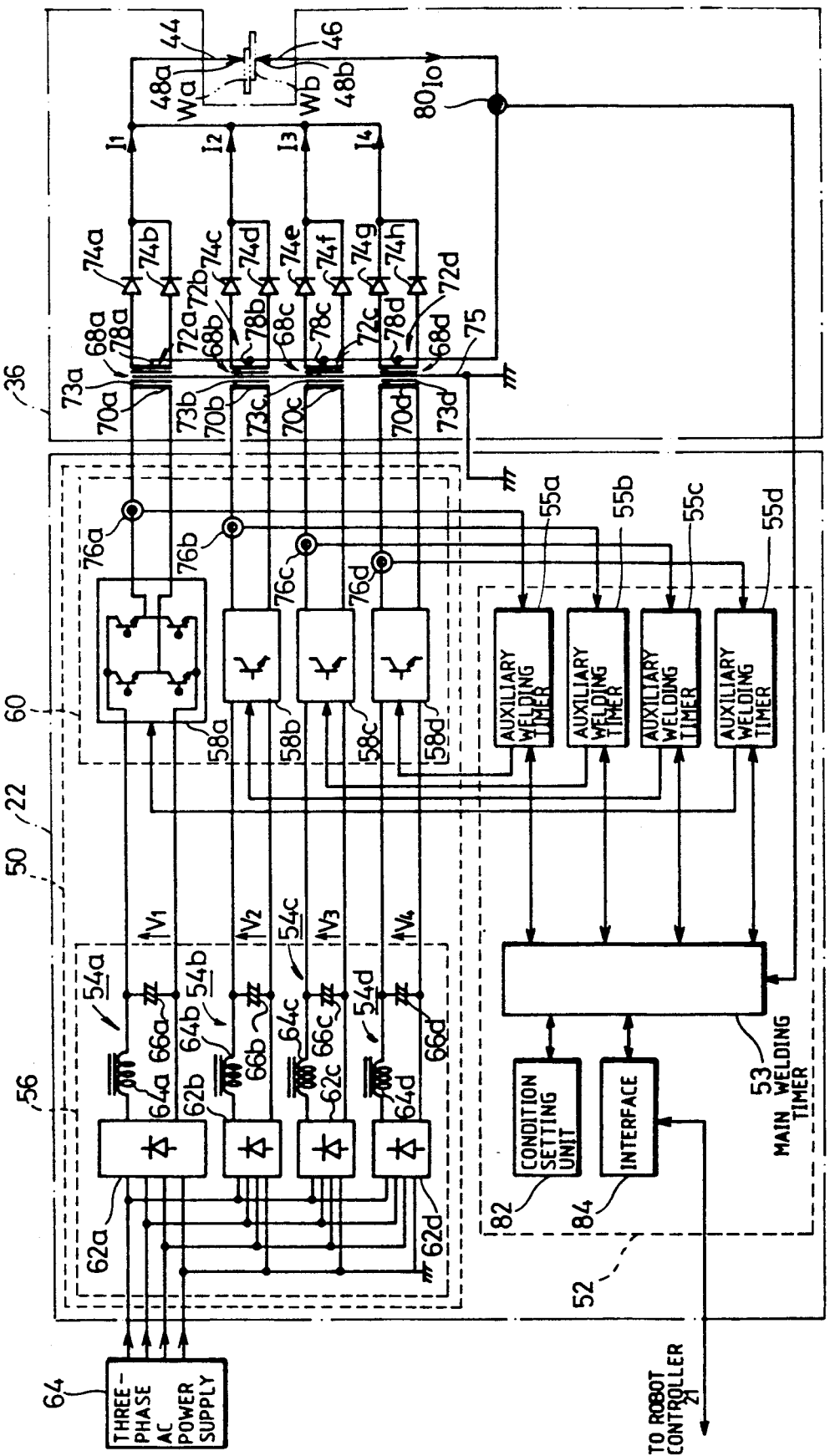

In the above first embodiment of the present invention the auxiliary welding timers 55a through 55d feed back the branch currents I1 through I4 for making the welding current constant. However, currents to be fed back may not be detected from the output sides of the welding transformers 68a through 68d, but may be detected somewhere else. For example, the current detectors 76a through 76d may be connected to the input terminals of the inverters 58a through 58d as shown in FIG. 5 according to a second embodiment, or may be connected to the output terminals of the inverters 58a through 58d as shown in FIG. 6 according to a third embodiment. The second and third embodiments shown in FIGS. 5 and 6, respectively, are advantageous from the manufacturing standpoint in that the current detectors 76a through 76d can be wired within the welding controller 22 rather than the welding robot 22.

In the first through third embodiments above, the auxiliary welding timers 55a through 55d have feedback control means such as comparator/amplifiers, and the main welding timer 53 monitors the welding current I0 for an abnormal condition, but does not effect feedback control. Consequently, the sum of the branch currents I1 through I4 may not necessarily be equal in magnitude to the welding current I0 due to stray capacitances present in the gun arms 44, 46. If more accurate control of the welding current I0 is required, a feedback control means such as a comparator/amplifier may be added to the main welding timer 53 shown in FIGS. 3 through 5 in accordance with a fourth embodiment, so that the welding current I0 can more accurately be controlled under feedback control for agreement with a command current value.

Figure 7:
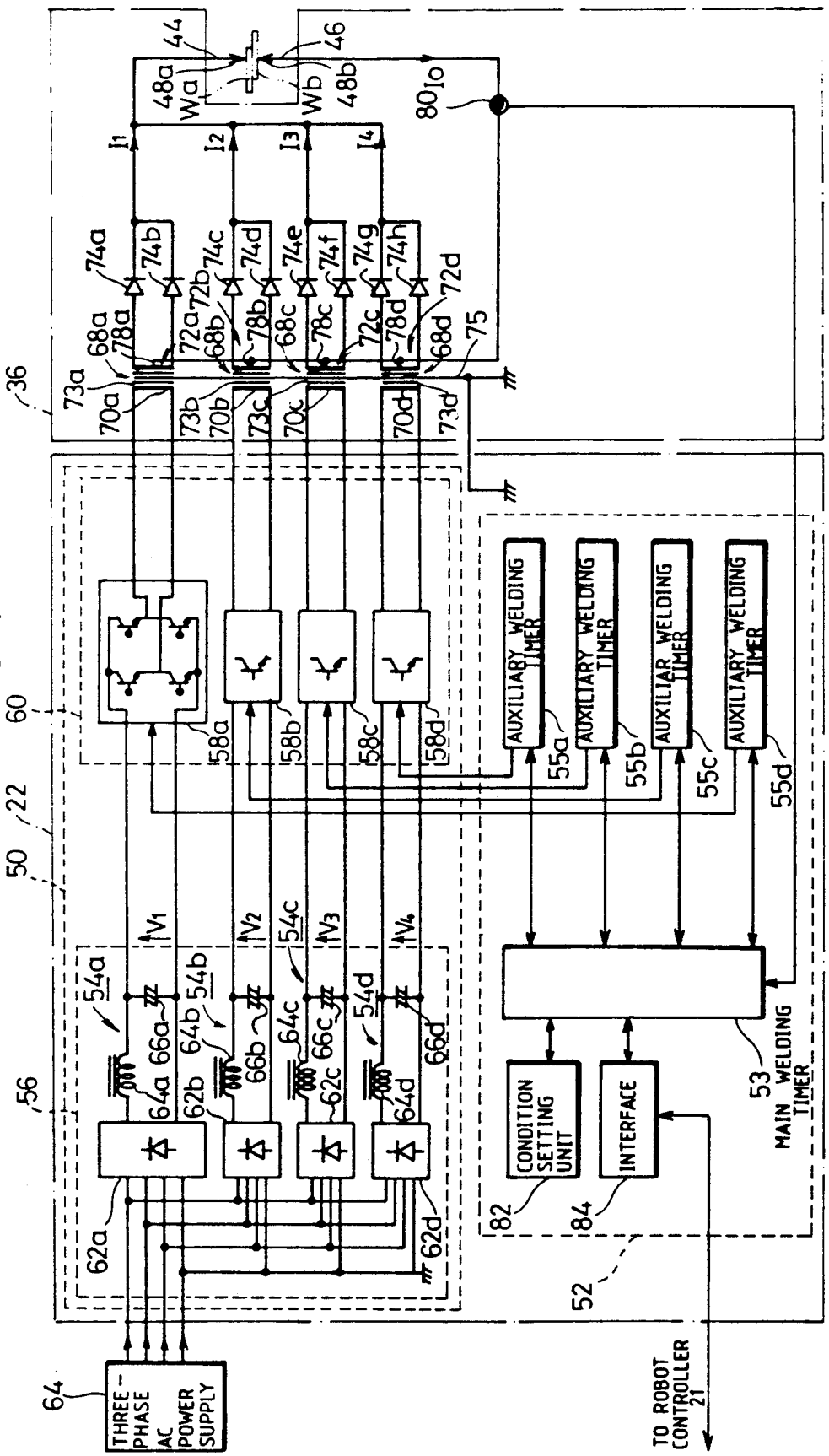

According to a fifth embodiment of the present invention, as shown in FIG. 7, no feedback control is effected by the auxiliary welding timers 55a through 55d, but a feedback control means is added to only the main welding timer 53 for the control of the welding current I0. With this arrangement, currents flowing through the transistors of the inverters 58a through 58d are not equalized to each other and current flowing through the diodes 74a through 74h are also not equalized to each other. However, these currents may be equalized by selecting those transistors and diodes which have either specifications and characteristics with sufficient margins or equal specifications and characteristics.

According to a sixth embodiment, the components of the inverters 58a through 58d and those of the welding transformer unit 36 are sorted out for close performance and specifications or performance and specifications with sufficient margins, as with the fifth embodiment above, and the feedback control means composed of the current detectors 76a through 76d, 80, the main welding timer 53, and the auxiliary welding timers 55a through 55d are dispensed with. In the sixth embodiment, no feedback control for the welding current I0 is carried out but the welding current I0 is supplied with only a feed-forward command.

In the first through sixth embodiments, the welding current to be supplied to the welding electrodes is produced by the current supply circuit which is constructed of parallel-connected rectifying circuits each comprising a welding transformer and rectifiers. This arrangement makes it possible to employ a relatively large welding current to be fed to the workpieces, and also allows the welding gun assembly to be small and light, thereby rendering the DC resistance welding apparatus well accessible for maintenance.

A DC resistance welding apparatus according to a seventh embodiment of the present invention will hereinafter be described with reference to FIGS. 8 and 9. According to the seventh embodiment, the time during which the semiconductors such as transistors of the inverters are conductive is monitored to allow the semiconductors to be used with currents higher than a continuous rating current range, so that a large welding current can be supplied to the workpieces. The seventh embodiment is not limited to the parallel connection of inverters and welding transformers.

As shown in FIG. 8, the DC resistance welding apparatus basically comprises a converter unit 122 for converting three-phase DC electric energy supplied from a three-phase AC power supply 120 to DC electric energy, an inverter unit 124 for converting the DC electric energy from the converter unit 122, an output transformer 128 as a welding transformer for changing the voltage from the inverter unit 124 to a different voltage, a base driver 130 for supplying pulse-width-modulated base currents to full-bridge-connected semiconductors such as power transistors 136a through 136d of the inverter unit 124, a control circuit 132, and a timer circuit 140. The base currents supplied from the base driver 130 are of a value large enough to make collector currents of the transistors 136a through 136d higher than a continuous DC rating range.

The timer circuit 140 comprises an AND gate 141, an oscillator 142 for generating a pulsed signal having a frequency higher than that of high-frequency AC electric energy produced from the inverter unit 124, a counter 144, and a setting unit 146 for setting the counter 144 to a preset count. The control circuit 13 supplies the timer circuit 140 with a timing gate signal Tm synchronous with a conduction time of the transistors 136a through 136d driven by base driver 130. In response to the timing gate signal Tm thus supplied, the counter 144 is operated to count the energization time. If the counted conduction time becomes longer than the preset count established by the setting unit 146, then the timer circuit 140 applies an output signal Toff to the base driver 130, which then cuts off the base currents supplied to the transistors 136a through 136d.

The converter unit 122 comprises a rectifying diode stack 134a, a reactor 134b, and a capacitor 134c. The output transformer 12B comprises a primary winding 152 a transformer core 154, and a secondary winding 156 having a central tap 157. The secondary winding 156 is connected at its opposite ends to terminals of the rectifiers 131a, 131b whose other terminals are connected in common to a welding electrode 158a. The central tap 157 of the secondary winding 157 is connected to a welding electrode 158b. Workpieces Wa, Wb are held between the welding electrodes 158a, 158b.

Operation and advantages of the DC resistance welding apparatus of the seventh embodiment thus constructed will be described below.

The workpieces Wa, Wb are gripped between and initially pressurized by the welding electrodes 158a, 158b. Three-phase AC electric energy from the three-phase AC power supply 120 is converted by the rectifying diode stack 134a, the reactor 134b, and the capacitor 134c of the converter unit 122 to DC electric energy which is applied to the inverter unit 124.

The base driver 130 is supplied with a timing gate signal Tm (see FIG. 9 at (a)) from the control circuit 132, and amplifies the timing gate signal Tm into base currents large enough to energize the transistors 136a through 136d connected in a full bridge of the inverter unit 124. The base currents are supplied to the respective transistors 136a through 136d to make the transistors 136a through 136d conductive and nonconductive at successive times. The DC current supplied to the inverter unit 124 is now converted to AC electric energy.

The AC electric energy produced by the inverter unit 124 is then supplied to the primary winding 152 of the output transistor 128, which induces AC electric energy of a different voltage across the secondary winding 156. The AC electric energy induced across the secondary coil 156 is rectified by the rectifiers 131a, 131b into DC electric energy which is thereafter supplied through the welding electrodes 158a, 158b to the workpieces Wa, Wb.

As described above with respect to the prior art, the transistors of the inverter unit of the conventional DC resistance welding apparatus are designed such that they operate within a continuous rating range. If the output signals from a base driver are maintained at a level corresponding to a transistor conduction state and as a result the transistors remain conductive, the transistors are prevented from being broken or destructed if they are within its thermal limits. Therefore, the actual level of electric energy applied to the inverter unit has to be held within the continuous rating range. The conventional DC resistance welding apparatus has not been suitable for use in applications wherein a large current is to be supplied to a welding machine.

The inventor has found that in a DC spot resistance welding machine, the time (utilization factor) during which a current is passed between the welding electrodes is considerably shorter than the time during which the DC spot resistance welding machine operates. For example, when welding workpieces of aluminum, the time during which a current is supplied to the electrodes is about 15 cycles (e.g., 0.3 sec.), and its ratio to the operation time of the welding machine including the time in which to energize the electrodes and move the workpieces is about 10%. If it is assumed that the inverter is switched at 800 Hz, then the time during which one of the transistors of the inverter is rendered conductive is 0.625 msec. at maximum, and remains nonconductive beyond that period of time. It is known that semiconductors such as power transistors, if used as switching elements of an inverter, can consume a large current with respect to a continuous rating range. Therefore, the semiconductors of the inverter in the spot resistance welding machine can be used with a switching current higher than the continuous rating range. In this case, however, when the switching operation is stopped and the semiconductors remain conductive, they tend to be broken. The inverter therefore needs a protective circuit for protecting the semiconductors from damage.

The timer circuit 140 is added for the purpose of protecting the transistors 136a through 136d. The control circuit 132 supplies the transistors 136a through 136d with current signals (base drive signals) through the base driver 130. When a timing gate signal Tm (see FIG. 9 at (a)), which is in synchronism with the conduction time of the transistors 136a through 136d, is applied to the timer circuit 140, the AND gate 141 is enabled during a high level interval corresponding to the conduction time, thus allowing output pulses S1 (see FIG. 9 at (b)) from the oscillator 142 to pass through the AND gate 141. The pulsed signal that has passed through the AND gate 141 is applied as a pulsed signal S2 (see FIG. 9(c)) to the counter 144, which then starts to count the pulsed signal S2. The counter 144 now measures the conduction time of the transistors 136a through 136d. When the measured conduction time exceeds a time ts preset in the setting unit 146 at a time tl, the timer circuit 140 produces an output signal Toff (see FIG. 9 at (d)). The output signal Toff is applied to the base driver 130 to forcibly cut off the base currents supplied from the base driver 130 to the transistors 136a through 136d. Accordingly, in the event that the conduction time of the transistors 136a through 136d exceeds a predetermined time, the transistors 136a through 136d are forcibly rendered nonconductive for protection against damage.

The counter 144 starts counting pulses in response to a positive-going edge of the timing gate signal Tm, and stops counting pulses and is reset in response to a negative-going edge of the timing gate signal Tm which is applied to a RESET terminal of the counter 144.

Figure 10:
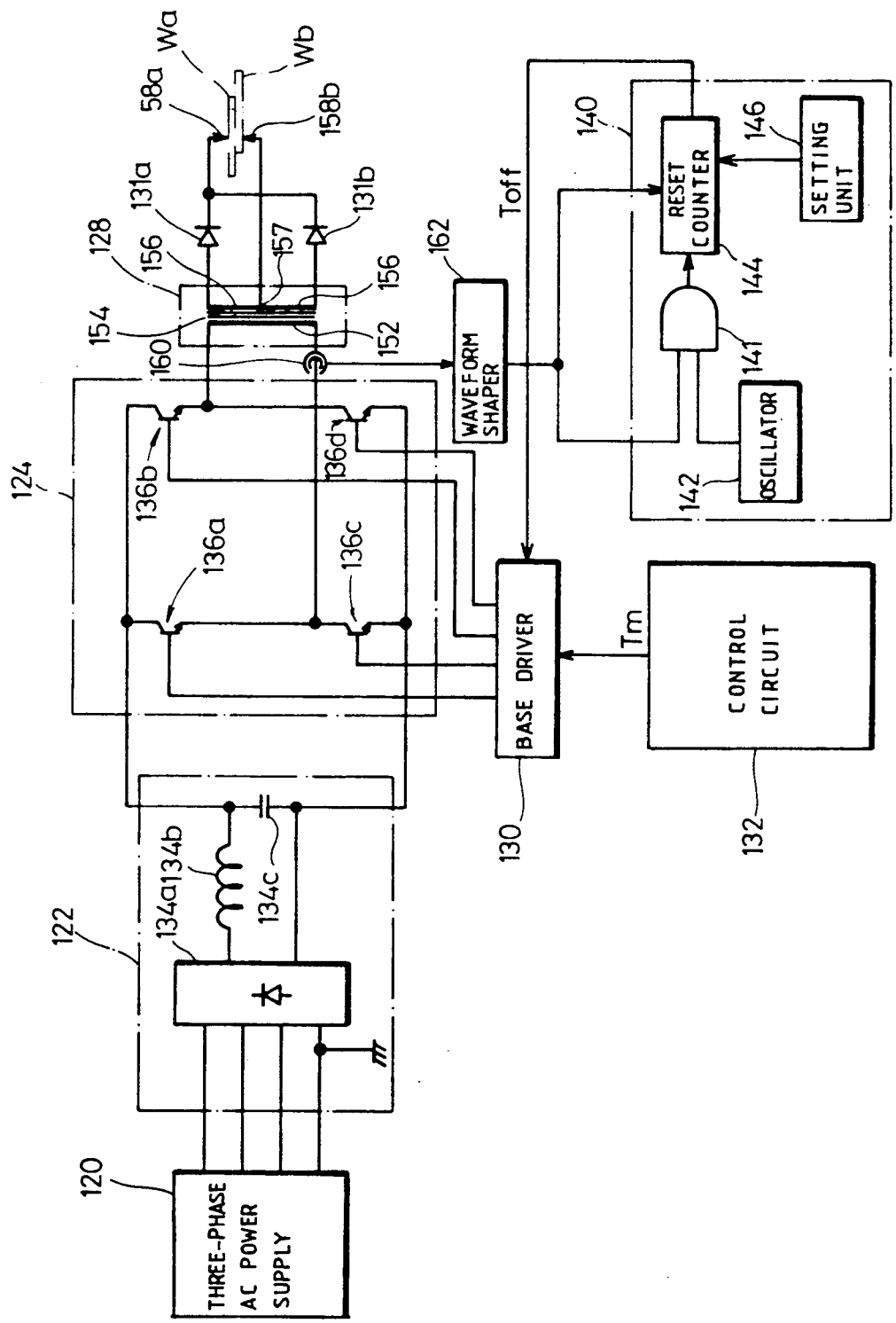
FIGS. 10 and 11 are circuit diagrams, partly in block form, of electric circuits of DC resistance welding apparatus according to yet other embodiments of the present invention.

In the above embodiment, the time corresponding to the conduction state of the transistors 136a through 136d is detected based on the base drive signals (i.e., the timing gate signal Tm) from the base driver 130. According to an eighth embodiment of the present invention, however, the actual conduction time of the transistors 136a through 136d may be detected as shown in FIG. 10. More specifically, a current detector 160 comprising a Hall-effect device or the like is connected to an output terminal of the inverter unit 124. An output signal from the current detector 160 is shaped in waveform by a waveform shaper 162 into such a level that can enable the AND gate 141. The output signal from the current detector 160 is applied to the AND gate 141 and the RESET terminal of the counter 144. With this arrangement, the timer circuit 140 can monitor the actual conduction time of the transistors 136a through 136d.

Figure 11:
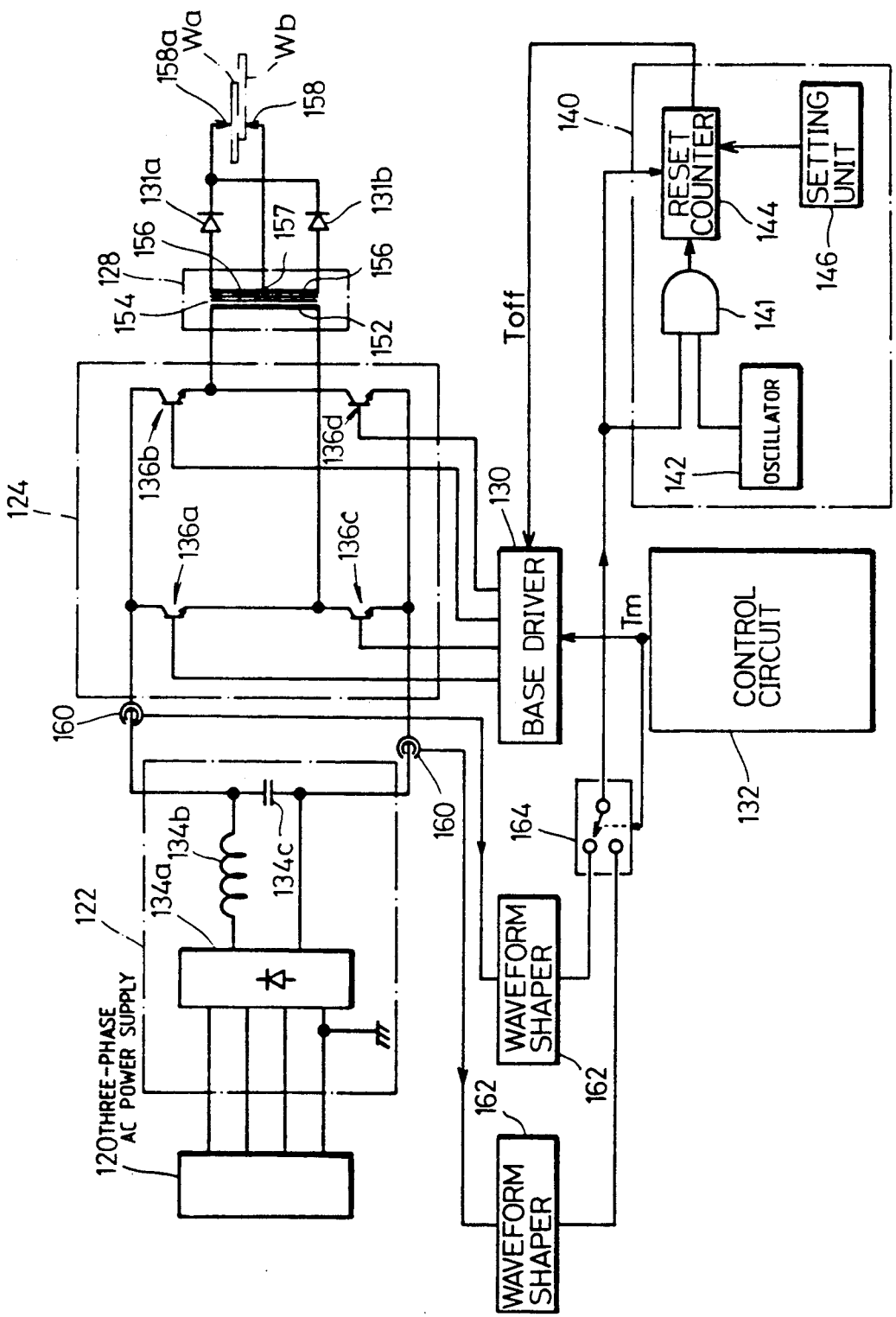

FIG. 11 shows a ninth embodiment in which two current detectors 160 are connected to the input terminals of the inverter unit 124, and two waveform shapers 162 are connected to the respective current detectors 160. Output signals from the waveform shapers 162 are applied to the timer circuit 140 through an electronic switch 164 such as a multiplier which is switched over each time a positive-going edge of the timing gate signal Tm is applied from the control circuit 132 to the electronic switch 164. The timer circuit 140 can therefore measure the actual conduction time of the transistors 136a through 136d.

According to the seventh through ninth embodiments described above, the conduction time of the semiconductors of the inverter unit is monitored by the timer circuit. When the semiconductors are conducted for a period of time longer than a predetermined period of time, they are forcibly rendered nonconductive. Consequently, the semiconductors can be used within a switching rating range, and can supply the welding robot with a welding current that is twice or three times larger than if they were operated within the conventional continuous rating range.

A DC resistance welding apparatus according to a tenth embodiment of the present invention will now be described below with reference to FIGS. 12 through 15. According to the tenth embodiment, failures such as output reductions or overcurrents of parallel inverters are individually detected, and all the inverters are quickly shut off in response to detection of such a failure.

Figure 12:
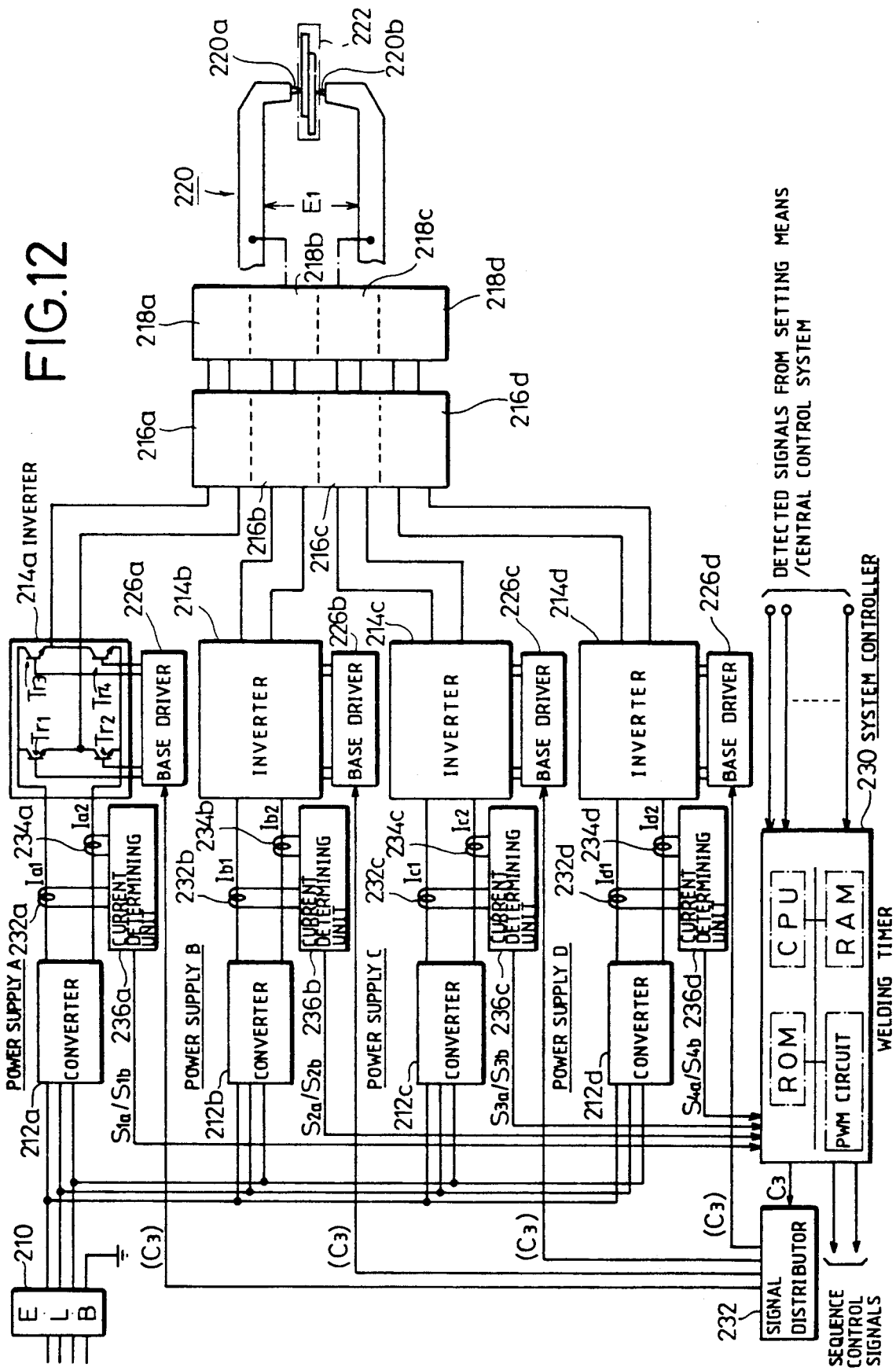
FIG. 12 is a circuit diagram, partly in block form, of an electric circuit of a DC resistance welding apparatus according to another embodiment of the present invention.

As shown in FIG. 12, the DC resistance welding apparatus includes a device 210 (including an ELB) for turning on and off three-phase AC electric energy having a voltage of 400 V, and parallel-connected power supplies A, B, C, D. The power supplies A, B, C, D respectively have converters 212a through 212d, inverters 214a through 214d, welding transformers 216a through 216d, and rectifiers 218a through 218d. DC electric energy E1, which is the sum of output currents from the rectifiers 218a through 218d, is supplied to a welding gun 220. The welding gun 220 has a pair of welding tips 220a, 220b for gripping workpieces 222 therebetween.

Base drivers 226a through 226d are connected respectively to the inverters 214a through 214d for supplying base drive currents to the bases of switching transistors Tr1, Tr2, Tr3, Tr4 which are connected in a full bridge. The base drivers 226a through 226d operate on the principle of pulse width modulation for varying the on and off times of pulses with a fixed frequency.

A system controller 230 comprises a one-chip microprocessor (welding timer) including a CPU, a RAM, a ROM, an I/O, and a PWM circuit. The system controller 230 is connected to a setting means/central control system including a computer for an FMS for effecting fully-closed numerical control, and carries out welding sequence control.

Three-phase AC electric energy of 400 V is rectified by the converters 212a through 212d into DC electric energy, which is then converted back to high-frequency pulses (which will also be referred to as AC electric energy) by the inverters 214a through 214d. This AC electric energy is supplied to the welding transformers 216a through 216d which converts the AC electric energy to large AC currents of a relatively low voltage of 10 V, for example. Then, the AC currents are rectified by the rectifiers 218a through 218d by way of full-wave rectification into direct currents which are added together into DC electric energy E1.

The system controller 230 is supplied with detected signals from failure detectors (not shown), the signals indicating a bus fuse breakage, a primary cable leakage, and temperatures of the switching transistors Tr1 through Tr4 and the welding transformers 216a through 216d. In response to these detected signals, the system controller 230 produces sequence control signals for effecting certain controlling operations such as de-energization of the converters 212a through 212d and the inverters 214a through 214d and shutting-off of the three-phase AC electric power by operating the power supply on/off device 210.

The above arrangement is a known inverter-controlled power supply system for use with a welding robot.

Current detectors 232a through 232d and 234a through 234d each in the form of a toroidal coil are disposed around the wires interconnecting the converters 212a through 212d and the inverters 214a through 214d of the power supplies A through D. These current detectors produce signals corresponding to polarity-inverted currents Ia1, Ib1, Ic1, Id1 and Ia2, Ib2, Ic2, Id2 which flow upon switching operation of the inverters 214a through 214d, and supply the produced signals to respective current determining units 236a, 236b, 236c, 236d.

The current determining unit 236a will hereinafter be described by way of example. The other current determining units 236b, 236c, 236d are identical in construction to the current determining unit 236a and will not be described in detail.

The current determining unit 236a has two signal processing sections connected respectively to the current detectors 232a, 234a. The two signal processing sections are structurally identical to each other.

Figure 13:
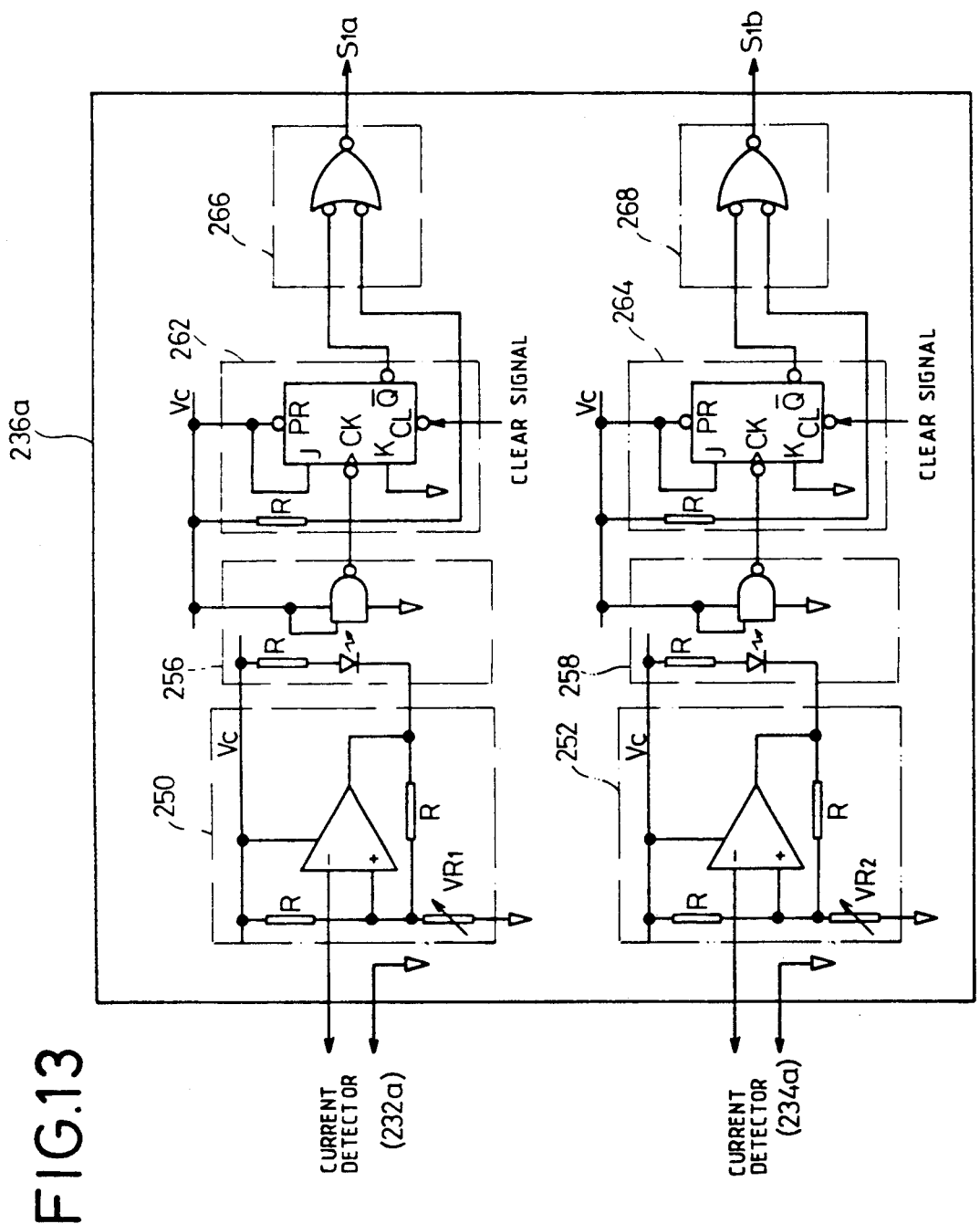
FIG. 13 is a block diagram of an abnormal current detector in the DC resistance welding apparatus shown in FIG. 12.

As shown in FIG. 13, signals from the current detectors 232a, 234a are supplied respectively to comparators 250, 252. The comparators 250, 252 are also supplied with reference levels from variable resistors VR1, VR2, respectively, the reference levels being the same as the levels of signals generated by the current detectors 232a, 234a when the inverters 214a through 214d operate normally. When the signals from the current detectors 232a, 234a are higher than the reference levels, as detected by the comparators 250, 252, output signals are produced by the comparators 250, 252. Noise is removed from the output signals from the comparators 250, 252 by isolators 256, 258. The signals from the isolators 256, 258 are then supplied to latches 262, 264 in the form of JK flip-flops which time the control operation of the system controller 230 and also to AND gates 266, 268 of negative-true logic, from which decision signals S1a, S1b are produced.

Figure 14:
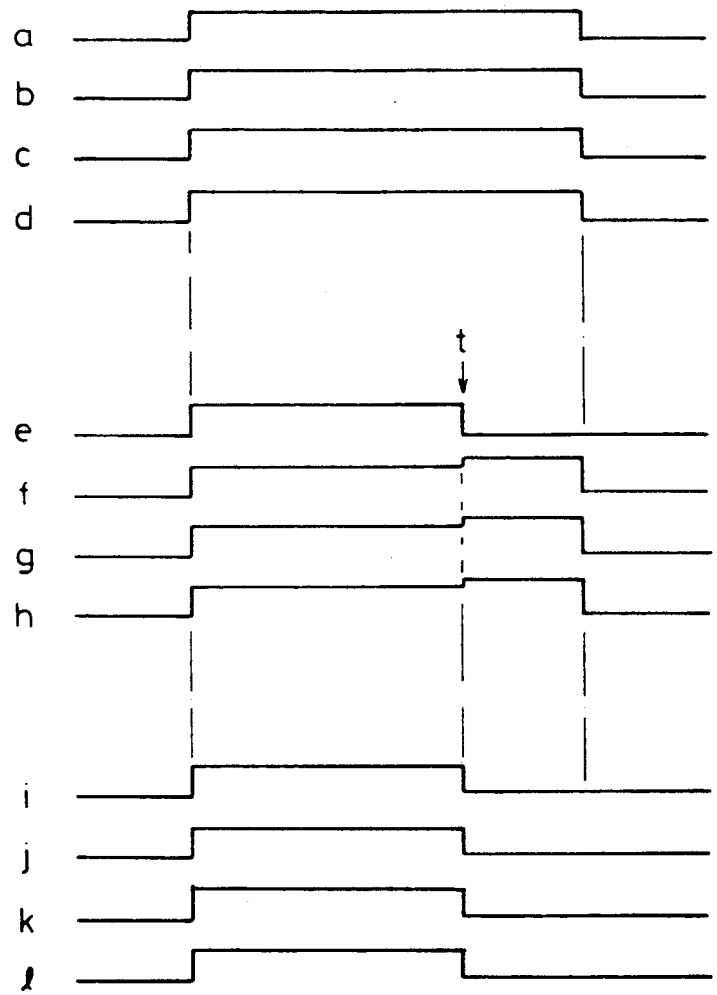
FIG. 14 is a diagram showing the manner in which direct currents are derived in the DC resistance welding apparatus shown in FIG. 12.

It is assumed that the currents Ia1 through Id1 and Ia2 through Id2 with their polarity inverted on a time base are first constant as shown in FIG. 14 at (a) through (d), i.e., the power supplies A through D operate normally. If the power supply A reduces or stops its power output after a time t, then the power supplies B through D produce overcurrents after the time t (FIG. 14 at (f) through (h)). As a result, the currents Ib1 through Id1 and Ib2 through Id2 are increased, and the current determining units 236b through 236d apply decision signals S2a, S2b through S4a, S4b to the system controller 230. The system controller 230 sequentially determines whether there are decision signals S1a, S1b through S4a, S4b or not. In this case, since the system controller 230 first encounters a decision signal S2a, it is determined that the inverter 214b is producing an overcurrent. The system controller 230 now stops supplying drive signals C3 (synchronous with a timing gate signal)

through a signal distributor 232 in order to de-energize the switching transistors Tr1 through Tr4 of the inverters 214a through 214d, i.e., to interrupt switching operation of the inverters. Therefore, in the event of an output reduction or failure of the inverter 214a due to damage of the switching transistor Tr1, for example, because of a distorting action of the welding transformer 216a, and the other inverters 214b through 214d produce overcurrents, all the inverters 214a through 214d are de-energized to prevent the other switching transistors from being damaged.

Any of the inverters 214a through 214d which has produced a reduced output or failed to produce an output may be visually indicated by an LED, for example, so that such a failing inverter, the inverter 214a in the above example, can quickly be confirmed.

Figure 15:
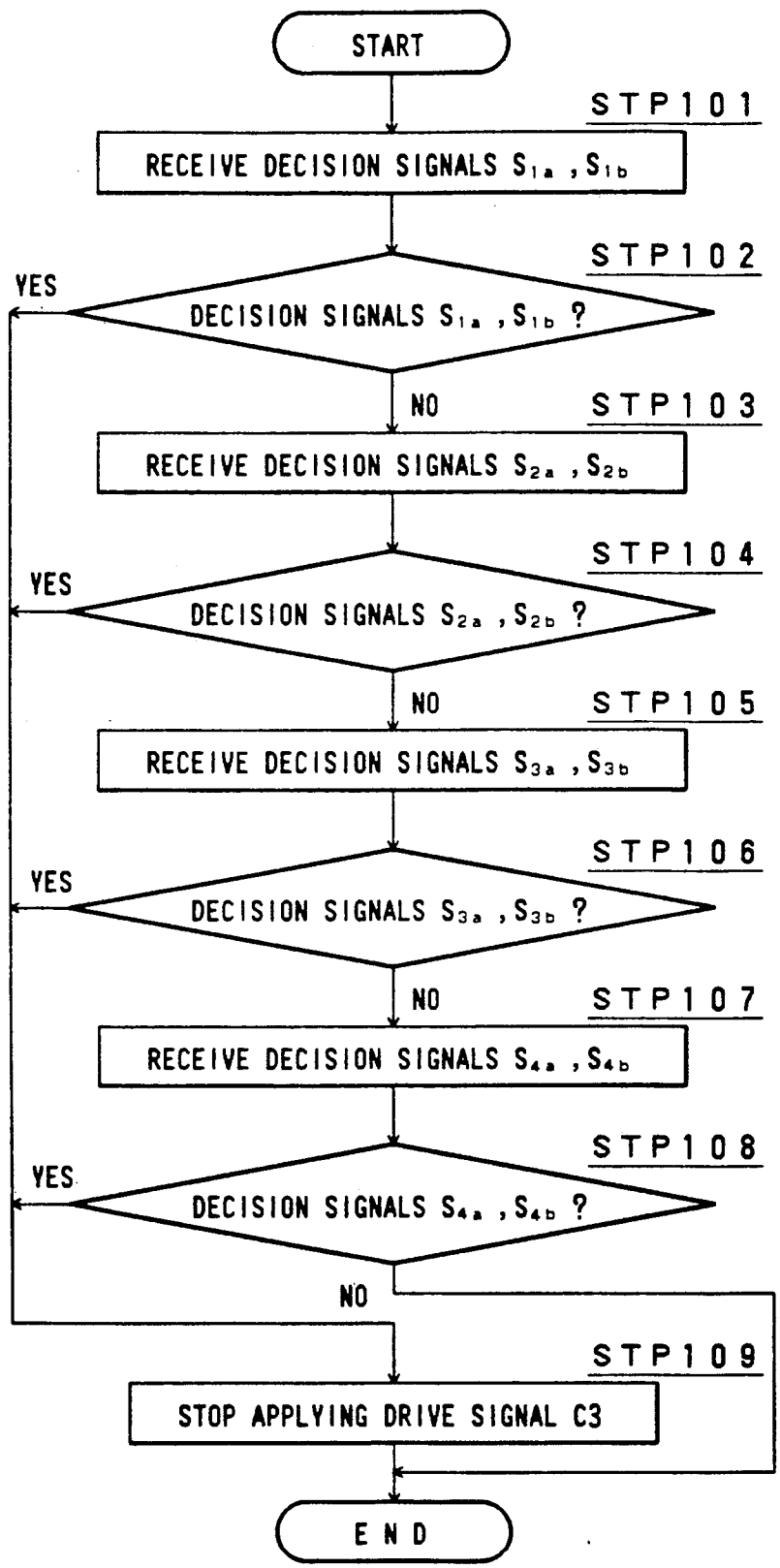
FIG. 15 is flowchart of a program of a system controller in the DC resistance welding apparatus illustrated in FIG. 12.

Sequence control of the system controller 230 for the control of the drive signals C3 according to a program stored in the ROM of the system controller 23 will be described below with reference to FIG. 15.

The program is executed by a welding start command from the setting means/central control system after the DC resistance welding apparatus has started operating.

First, the system controller 230 is instructed to receive decision signals S1a, S1b in a step 101. A next step 102 determines whether the system controller 230 has received decision signals S1a, S1b. If not, then control goes to a step 103, and if yes, control goes to a step 109.

Then, the system controller 230 is instructed to receive decision signals S2a, S2b in the step 103. A next step 104 determines whether the system controller 230 has received decision signals S2a, S2b. If not, then control goes to a step 105, and if yes, control goes to the step 109.

The system controller 230 is instructed to receive decision signals S3a, S3b in the step 105. A next step 106 determines whether the system controller 230 has received decision signals S3a, S3b. If not, then control goes to a step 107, and if yes, control goes to the step 109.

The system controller 230 is instructed to receive decision signals S4a, S4b in the step 107. A next step 108 determines whether the system controller 230 has received decision signals S4a, S4b. If not, then the program is ended, and if yes, control goes to the step 109.

In the step 109, the system controller 230 stops applying the drive signals C3 to the base drivers 226a through 226d. Then, the program is brought to an end.

After the step 109, the program starts being executed again. The execution of the program is repeated as long as the system controller 230 is operated.

In the above embodiment, overcurrents from the converters 212a through 212d are detected, and then the inverters 214a through 214d are de-energized. However, the current determining units 236a through 236d may detect whether the inverters 214a through 214d have reduced or stopped their outputs, and stop operation of the inverters 214a through 214d. Alternatively, the current detectors 232a through 232d and 234a through 234d may be connected between the inverters 214a through 214d and the welding transformers 216a through 216d.

With the above embodiment, failures of the parallel inverters, i.e., output reductions or overcurrents, are individually detected, and upon detection of such a failure, all the inverters are quickly de-energized for effective protection of the switching transistors of the inverters.

A DC resistance welding apparatus according to an eleventh embodiment of the present invention will be described with reference to FIGS. 16 through 18.

Figure 16:
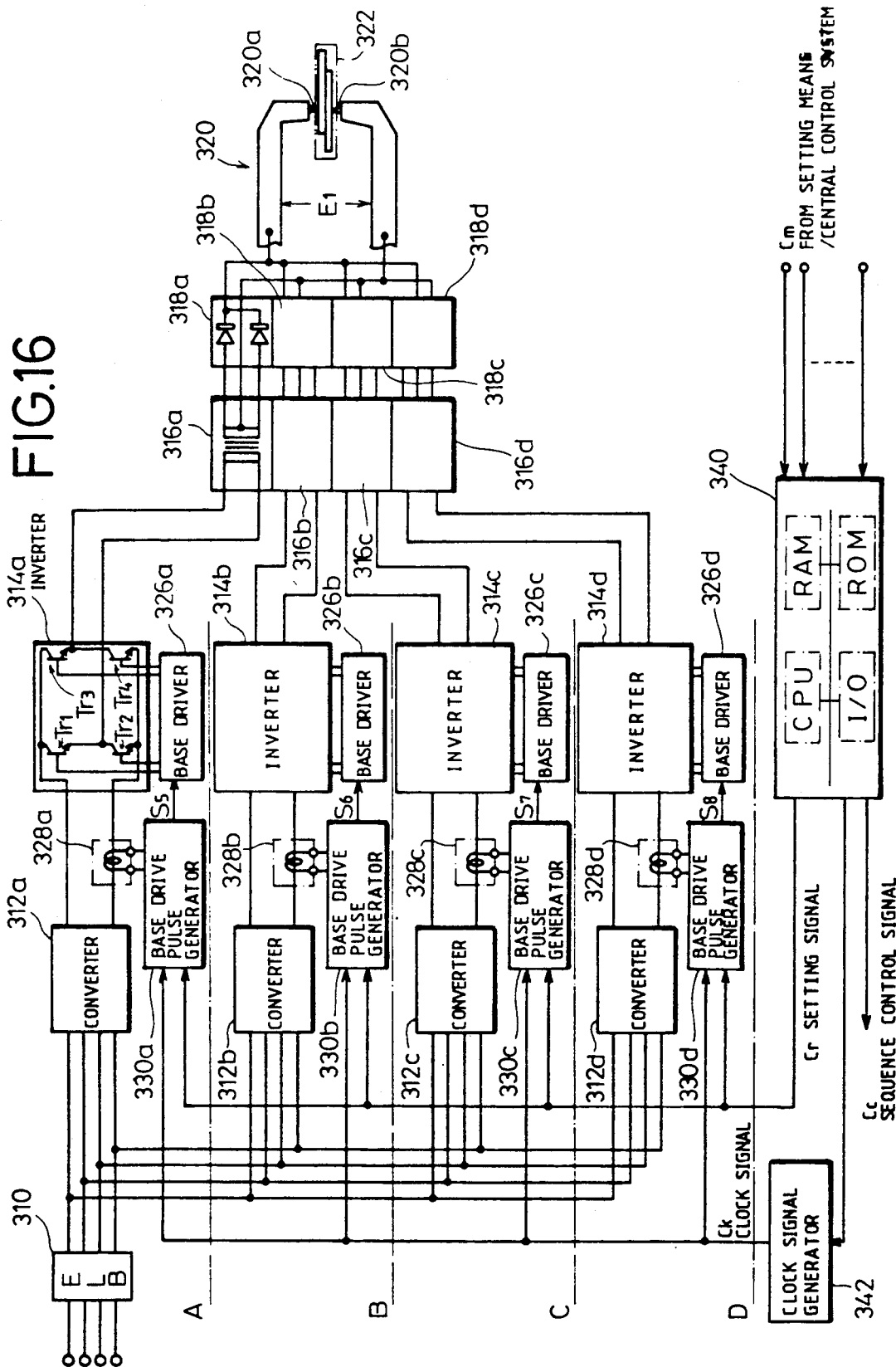
FIG. 16 is a block diagram of a DC resistance welding apparatus according to a further embodiment of the present invention.

As shown in FIG. 16, the DC resistance welding apparatus includes a device 210 (including an ELB) for turning on and off three-phase AC electric energy having a voltage of 400 V, and parallel-connected power supplies A, B, C, D. The power supplies A, B, C, D respectively have converters 312a through 312d, inverters 314a through 314d, welding transformers 316a through 316d, and rectifiers 318a through 318d. DC electric energy E1, which is the sum of output currents from the rectifiers 318a through 318d is supplied to a welding gun 320. The welding gun 320 has a pair of welding tips 300a, 320b for gripping workpieces 322 therebetween.

Base drivers 326a through 326d are connected respectively to the inverters 314a through 314d for supplying base drive currents to the bases of switching transistors Tr1, Tr2, Tr3, Tr4 which are connected in a full bridge. Detectors 328a through 328d in the form of toroidal coils for producing detected signals corresponding to switching waveforms from the converters 312a through 312d to the inverters 314a through 314d are disposed around the wires interconnecting the converters 312a through 312d and the inverters 314a through 314d. The detected signals from the detectors 328a through 328d are supplied to respective base drive pulse generators 330a through 330d which generate and apply drive pulses S5, S6, S7, S8 to the base drivers 326a through 326d.

A system controller 340 comprises a one-chip microprocessor (welding timer) including a CPU, a RAM, a ROM, and an I/O. The system controller 340 is supplied with control signals Cm from a setting means/central control system including a computer for an FMS for effecting fully-closed numerical control, and carries out welding sequence control. The system controller 340 generates a setting signal Cr which selects a switching frequency for the inverters 314a through 314d to set a change in the DC electric energy E1 applied to the welding gun 320, i.e., welding energy, to a desired level. The system controller 340 applies the setting signal Cr to the base drive pulse generators 330a through 330d.

A clock signal Cm is generated and applied by a clock signal generator 342 to the base drive pulse generators 330a through 330d in response to an operation start command from the system controller 340.

Figure 17:
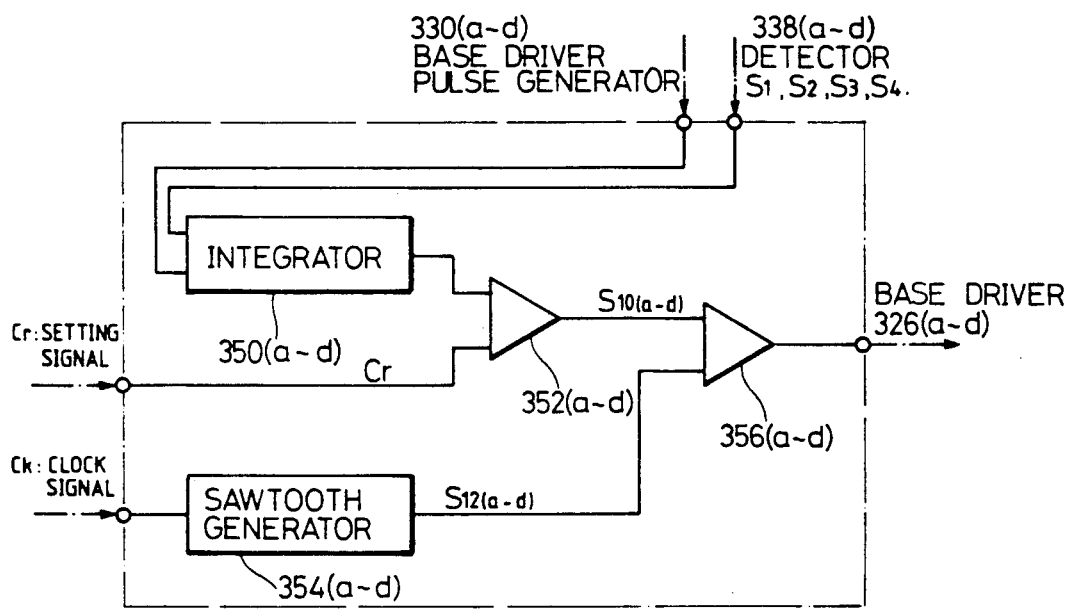
FIG. 17 is a block diagram of a base drive pulse generator in the DC resistance welding apparatus shown in FIG. 16.

The base drive pulse generators 330a through 330d are shown in detail in FIG. 17. They are identical in construction to each other, and those reference characters placed in parentheses correspond to the base drive pulse generators 330b, 330c, 330d.

The base drive pulse generators 330a (330b, 330c, 330d) have integrators 350a (350b, 350c, 350d) supplied with detected signals S1 (S2, S3, S4), and comparators 352a (352b, 352c, 352d) which are supplied with the setting signal Cr and integrated signals from the integrators 350a (350b, 350c, 350d) and produce differential signals S10a (S10b, S10c, S10d). The base drive pulse generators 330a (330b, 330c, 330d) also have sawtooth generators 354a (354b, 354c, 354d) supplied with a clock signal Ck from the clock signal generator 342 for generating sawtooth signals S12a (S12b, S12c, S12d), and comparators 356a (356b, 356c, 356d) supplied with the differential signals S10a (S10b, S10c, S10d) and the sawtooth signals S12a (S12b, S12c, S12d). The comparators 356a (356b, 356c, 356d) produce drive pulses S5, S6, S7. S8 with the differential signals S10a (S10b, S10c, S10d) used as a threshold level.

The circuit arrangement composed of the clock signal generator 342 and the base drive pulse generators 330a through 330d operate on the principle of pulse width modulation for varying the on and off times of pulses with a fixed frequency.

Operation of the DC resistance welding apparatus shown in FIG. 12 will be described below.

When control signals Cm are supplied to the system controller 340, a clock signal Ck is supplied to the sawtooth generators 354a through 354d. Sawtooth signals S12a through S12d generated by the sawtooth generators 354a through 354d and differential signals S10a through S10d corresponding to detected signals S1 through S4 are applied to the comparators 356a through 356d. Drive pulses S5 through S8 with the differential signals S10a through S10d used as a threshold level are supplied to the base drivers 326a through 326d. The drive pulses S5 through S8 are divided and shaped in waveform by the base drivers 326a through 326b, and then supplied to the bases of the switching transistors Tr1 through Tr4 of each of the inverters 314a through 314d to turn on the transistors Tr1 through Tr4. DC electric energy supplied from the converters 312a through 312d to the inverters 314a through 314d is now converted to pulsed high-frequency AC electric energy. This AC electric energy is then supplied to the welding transformers 316a through 316d by which it is converted to large currents having a relatively low voltage of 10 V, for example. The currents from the welding transformers 316a through 316d are rectified by the rectifiers 318a through 318d by way of full-wave rectification into direct currents which are combined into DC electric energy E1.

The above arrangement is a known inverter-controlled power supply system for use with a welding robot.

If any one of the welding transformers 316a through 316d causes a distorting action due to a change in their impedance resulting from a fluctuation in the load presented by the workpieces, then the pulse duration of one of the detected signals S1 through S4 is varied. Therefore, a corresponding one of the differential signals S10a through S10d varies as shown in FIG. 18. It is assumed here that the detected signal S2 varies as indicated at (b) in FIG. 18.

From the sawtooth signals S12a through S12d supplied to the comparators 356a through 356d are generated drive pulses S5 through S8 using the differential signals S10a through S10d. The generated drive pulses S5 through S8 are then applied to the base drivers 326a through 326d.

As can be seen from FIG. 18, the drive pulses S5 through S8 have trailing edges equalized to each other in timing, so that no peaky currents or overcurrents are generated at the trailing edges of the output waveforms from the inverters 314a through 314d.

While the detectors 328a through 328d are connected between the converters 312a through 312d and the inverters 314a through 314d in the illustrated embodiment, the detectors 328a through 328d may be connected between the inverters 314a through 314d and the welding transformers 316a through 316d.

In the embodiment shown in FIGS. 16 through 18, the trailing edges of base drive pulses are equalized in timing to cope with a distorting action of the welding transformers associated with the plural power supplies.

Since no overcurrents are generated at the trailing edges of the output signals from the inverters, the DC resistance welding apparatus has increased efficiency.

FIGS. 19 and 20 illustrate a DC resistance welding apparatus according to a twelfth embodiment of the present invention. According to this embodiment, a signal corresponding to an energized condition of workpieces is indirectly and accurately produced from a change in a current upon switching operation of inverters, and the application of electric energy to the workpieces is stopped based on the signal thus produced, so that the workpieces can appropriately be welded. This embodiment is not limited to parallel-connected inverters and parallel-connected transformers.

As shown in FIG. 19, the DC resistance welding apparatus comprises an inverter-controlled power supply unit A including a welding gun, a detector unit B (detecting means) for producing a signal corresponding to an output signal (waveform) upon switching operation of the power supply unit A, a differential signal calculating unit C (corresponding to a leading/trailing edge current detecting means and a calculating means) for generating leading and trailing edge current signals from the signal produced by the detector unit B, and generating and applying a differential current signal, and a control unit D (control means) for generating a control signal for the detection of leading and trailing edge currents) and effecting the closed-loop control of the entire apparatus.

The power supply unit A has a converter 412, an inverter 414, a welding transformer 416, and rectifiers 418a, 418b. DC electric energy E1 combined by the output terminals of the rectifiers 418a, 418b is applied to a welding gun 420. The welding gun 420 has a pair of welding tips 420a, 420b for gripping workpieces 422 therebetween.

The detector unit B comprises a current detector in the form of a toroidal coil or the like, which is disposed around the wire interconnecting the inverter 414 and the welding transformer 416 for producing a detected signal S1a corresponding to switching operation signal S1.

The differential signal calculating unit C comprises track hold amplifiers 424, 426 which are supplied with timing signals St1, St2 for holding the leading and trailing edges of the detected signal S1a, and a logarithmic amplifier 428 which is supplied with output signals S3, S4 from the track hold amplifiers 424, 426 through respective resistors R1, R2 and which produces an analog logarithmic signal S6.

The control unit D comprises a welding system controller, for example, and includes a base driver 430 for applying drive signals to the bases of switching transistors Tr1, Tr2, Tr3, Tr4 connected in a full bridge, a timing generator 432 for producing timing signals St1, St2, and a PWM circuit 434 for producing a signal processed by the principle of pulse width modulation which varies the on and off times of pulses with a fixed frequency, and applying the produced signal to the base driver 430. The control unit D also has a microprocessor (MPU) 436 including a CPU, a RAM, a ROM, and an I/O. The microprocessor 436 controls the DC resistance welding apparatus under closed-loop control, and is supplied with the calculated signal S6 and a welding start command signal Cc from a setting means/central control system including a computer for an FMS for effecting fully-closed numerical control, and carries out welding sequence control.

To the control unit D, there are connected a monitor 440 for visually displaying numerical values and waveforms representative of data processed by the various components of the apparatus, and a setting unit 442 for indicating numerical values and waveforms to be displayed and establishing control instructions in cooperation with the MPU 436.

The DC resistance welding apparatus of the twelfth embodiment will operate a follows:

In response to a welding start command signal Cc applied to the MPU 436, the MPU 436 operates the PWM circuit 434. Drive signals from the base driver 430 are applied to the inverter 414 to start operating the inverter 414. Three-phase AC electric energy of 400 V is rectified by the converter 412 to DC electric energy, which is converted by the inverter 414 to a pulsed high-frequency AC switching operation signal S1. This signal S1 is then supplied to the welding transformer 416 which converts the signal S1 to a large current having a relatively low voltage of 10 V, for example. The alternating current is rectified by the rectifiers 418a, 418b by way of full-wave rectification into DC electric energy E1.

The detector unit B produces a detected signal S1a (FIG. 20 at (a)) corresponding to the switching operation signal S1 produced by the inverter 414. The detected signal S1a is then supplied to the track hold amplifiers 424, 426, which are also supplied with timing signals St1, St2 (FIG. 20 at (b) and (c)) that correspond to a leading edge (current I) and a trailing edge (current I0) of the detected signal S1a. The timing signals St1, St2 are generated by the timing generator 432 based on the signal from the PWM circuit 434. The track hold amplifiers 424, 426 produce output signals S3, S4 and apply them through the respective resistors R1, R2 to the logarithmic amplifier 428. The output signals S3, S4 have levels V1, V2, respectively, corresponding to the currents I, I0 at the leading and trailing edges, as shown in FIG. 20 at (d) and (e). The logarithmic amplifier 428 generates an analog logarithmic signal S6 through an analog logarithmic process defined by:

$$\log_e \frac{I}{I0} = -\frac{R}{L} T = R\sigma$$

where L is the inductance of the secondary winding of the welding transformer 416, R is the resistance of the secondary winding of the welding transformer 416, T is the time during which the detected signal S1a remains low in level, and o is a constant.

The signal S6 thus produced is of a value based on the assumption that the resistances of the rectifiers 418a, 418b and the welding gun 420 are constant and can be ignored. An area indicated by m in FIG. 20 at (a) corresponds to the amount of energy consumed by the workpieces 422 when the welding current passes therethrough, i.e., a change in the resistance of the workpieces 42 due the formation of a nugget at the time the workpieces 422 are welded together.

The signal S6 is supplied through a squarer (not shown) to the MPU 436 which converts the signal to a digital signal by quantization. Then, the digital signal is sampled with a timing signal shown in FIG. 20 at (f), and the numerical value and waveform of the sampled signal are visually displayed by the monitor 440.

In this manner, a change in the resistance of the workpieces 422 gripped by the welding tips 420a, 420b at the time the welding current passes through the workpieces 422 can indirectly be obtained from the currents I, I0 at the leading and trailing edges of the switching operation signal S1 of the inverter 414.

By referring to the displayed numerical value and waveform, the operator can apply electric energy to workpieces 422 of a different kind while controlling the DC power E1 applied between the welding tips 420a, 420b so as to achieve a high mechanical strength without expulsion and surface flash which would otherwise be experienced empirically and experimentally.

The control of the DC power E1 is effected as follows: Times for starting and stopping energization and a conduction time are entered through the setting unit 442 and the monitor 440 into the RAM in the MPU 436.

Then, the workpieces 422 are fed and fixed according to various fully-closed numerical control modes on the production line controlled by setting means/central control system including a computer for an FMS. After the workpieces 422 have been pressurized by the welding gun 420, the MPU 436 instructs the PWM circuit 434 to apply a signal to the base driver 430 based on the times for starting and stopping energization and the energization time which are stored in the RAM thereof. In this manner, the workpieces 422 can be welded for a high mechanical strength without expulsion and surface flash.

With the embodiment shown in FIGS. 19 and 20, a signal corresponding to the energized condition of the workpieces is indirectly obtained based on a change in the current from the inverter. Consequently, any wire for detecting a change in the voltage between the welding tips or electrodes, i.e., a change in the resistance of the workpieces upon growth of a nugget through which the welding current passes, is not required. Any noise produced when the detected voltage is dropped or the current is passed is reduced, and the change in the resistance of the workpieces at the time the welding current passes therethrough can be produced highly accurately.

Furthermore, based on the resistance of different workpieces at the time the welding current passes through, the times for starting and stopping energization of workpieces, i.e., the supply of the welding current to the workpieces, and the energization time can appropriately be controlled.

Although certain preferred embodiments have been shown and described, it should be understood that many changes and modifications may be made therein without departing from the scope of the appended claims.

What is claimed is:

1. A DC resistance welding apparatus comprising:
   a pair of welding electrodes for sandwiching workpieces to be welded therebetween;
   a circuit connected to said welding electrodes for supplying a welding current to said welding electrodes, said circuit including a plurality of parallel-connected rectifying circuits each having a welding transformer and a rectifier;
   a plurality of inverters connected respectively to said rectifying circuits for driving said rectifying circuits;
   auxiliary control means, connected respectively to said inverters, for energizing said inverters;
   current detecting means for generating signals proportional to branch welding currents supplied respectively from said rectifying circuits and for feeding said signals back to said auxiliary control means; and main control means, connected to said auxiliary control means, for calculating command values indicative of branch welding currents to be reproduced by the respective inverters based on a command value for the welding current and for supplying the calculated command values to said auxiliary control means;

said auxiliary control means including feedback control means for maintaining the branch welding current constant based on said calculated command values;

said main control means including timer means for synchronizing production of said branch welding currents.

2. The DC resistance welding apparatus according to claim 1, wherein said welding transformer includes a secondary winding having a central tap and said rectifying circuit includes a pair of rectifiers, said central tap serving as one output terminal of each of said rectifying circuits, said secondary winding having one end connected to one terminal of one of said rectifiers and the other end connected to one terminal of the other of said rectifiers, the other terminals of said rectifiers being connected to each other as another output terminal of each of said rectifying circuits, said one output terminals of said rectifying circuits being connected together to one of said welding electrodes, and the other output terminals of said rectifying circuits being connected together to the other of said welding electrodes.

3. The DC resistance welding apparatus according to claim 1, further comprising:

second current detecting means for generating a signal proportional to the welding current supplied to said welding electrodes and for feeding said signal back to said main control means;

said main control means having feedback control means for maintaining said welding current constant based on said signal fed from said second current detecting means to said main control means.

4. The DC resistance welding apparatus according to claim 1, wherein said feedback control means maintains said branch welding currents constant based on said signals fed from said current detecting means to said auxiliary control means.

5. The DC resistance welding apparatus according to claim 1, further comprising:

a plurality of converters, connected respectively to said inverters, for supplying a DC current to said inverters;

said current detecting means detecting currents flowing either between said converters and said inverters or currents from said inverters;

said current detecting means producing signals indicating the detected currents; and comparing means for comparing the signals from said detecting means with predetermined levels for producing decision signals;

said main control means being responsive to said decision signals to inactivate the inverters.

6. The DC resistance welding apparatus according to claim 5, wherein said detecting means includes isolator means for removing noise from the signals produced by said detecting means.

7. A DC resistance welding apparatus comprising:

a pair of welding electrodes for sandwiching workpieces to be welded therebetween;

a plurality of power supplies, each including a converter, an inverter, a welding transformer, and a rectifier, for supplying a welding current produced from the rectifiers to said welding electrodes;

detecting means for producing detected signals indicative of operation of the inverters supplied with switching drive signals;

means for comparing said detected signals and said switching drive signals and for producing distorting action signals representing distorting actions of said welding transformers; and control means, responsive to said distorting action signals, for controlling leading edges of the respective switching drive signals to equalize trailing edges thereof.

8. The DC resistance welding apparatus according to claim 7, wherein said control means includes a clock signal generator for generating a clock signal, a sawtooth generator for generating a sawtooth signal from said clock signal, and a comparator for comparing said distorting action signals with said sawtooth signal to produce switching drive signals having pulse durations determined by the distorting action signals as a threshold level and trailing pulse edges.

* * * * *